US012712123B2

(12) United States Patent
Dickerson

(10) Patent No.: US 12,712,123 B2
(45) Date of Patent: Aug. 18, 2026

(54) CURRENT TRANSFORMER WITH IMPROVED PERFORMANCE

(71) Applicant: Arbiter Systems, Inc., Paso Robles, CA (US)

(72) Inventor: William J. Dickerson, Saint George, UT (US)

(73) Assignee: ARBITER SYSTEMS, INC., Paso Robles, CA (US)

( * ) Notice: Subject to any disclaimer, the term of this patent is extended or adjusted under 35 U.S.C. 154(b) by 918 days.

(21) Appl. No.: 17/978,085

(22) Filed: Oct. 31, 2022

(65) Prior Publication Data

US 2024/0145165 A1 May 2, 2024

(51) Int. Cl.
*H01F 38/28* (2006.01)
*H01F 27/28* (2006.01)
*H01F 27/40* (2006.01)

(52) U.S. Cl.
CPC ............. *H01F 38/28* (2013.01); *H01F 27/28* (2013.01); *H01F 27/402* (2013.01)

(58) Field of Classification Search
CPC ......... H01F 38/28; H01F 27/28; H01F 27/402
See application file for complete search history.

(56) References Cited

U.S. PATENT DOCUMENTS 1,357,197 A 10/1920 Brooks
1,743,752 A 1/1930 Boyajian
2,071,832 A 2/1937 Harder
2,243,162 A 5/1941 Lee
2,428,613 A 10/1947 Boyaiian
2,889,519 A 6/1959 Montgomery
2,891,214 A 6/1959 Rogers
2,944,207 A 7/1960 Rogers
3,089,999 A 5/1963 Dortort
3,497,793 A 2/1970 Gasparini
3,534,247 A 10/1970 Miljanic
3,815,011 A 6/1974 Milkovic
3,815,012 A 6/1974 Milkovic
3,815,013 A 6/1974 Milkovic
3,848,178 A 11/1974 Marks
(Continued)

OTHER PUBLICATIONS

Arbiter Systems; "Model 936A Reference Current Transformer Operation Manual"; Nov. 2005; 14 pages.
(Continued)

*Primary Examiner* — Lee E Rodak
*Assistant Examiner* — Zannatul Ferdous
(74) *Attorney, Agent, or Firm* — Fitch, Even, Tabin & Flannery LLP

(57) ABSTRACT

The present disclosure describes techniques and designs that may be implemented for improving current transformer accuracy (e.g., while reducing additional complexity and costs). In some aspects, described embodiments may implement usage of a current mirror to reduce current transformer error. Additionally or alternatively, some described embodiments may implement Hall-effect sensors (e.g., in place of conventional first stages in a two-stage current transformer design). Such embodiments, as well as other described embodiments, may improve accuracy of current transformers in a more efficient manner (e.g., current transformer accuracy may be improved while reducing or minimizing additional complexity, costs, etc.).

14 Claims, 17 Drawing Sheets

(56) References Cited

U.S. PATENT DOCUMENTS

| | | | |
|---|---|---|---|
| 3,881,149 | A | 4/1975 | Kiko |
| 3,916,310 | A | 10/1975 | Stark |
| RE28,851 | E | 6/1976 | Milkovic |
| 4,007,414 | A | 2/1977 | Shima |
| 4,032,837 | A | 6/1977 | Panu |
| 4,096,363 | A | 6/1978 | Earp |
| 4,182,982 | A | 1/1980 | Locke, Jr. |
| 4,198,595 | A | 4/1980 | Milkovic |
| 4,217,620 | A | 8/1980 | Masson |
| 4,255,704 | A | 3/1981 | Milkovic |
| 4,255,705 | A | 3/1981 | Milkovic |
| 4,278,940 | A | 7/1981 | Milkovic |
| 4,309,652 | A | 1/1982 | Ito |
| 4,492,919 | A | 1/1985 | Milkovic |
| 4,629,974 | A | 12/1986 | Friedl |
| 4,635,055 | A | 1/1987 | Fernandes |
| 4,652,810 | A | 3/1987 | Hayashi |
| 4,682,101 | A | 7/1987 | Cattaneo |
| 4,698,740 | A | 10/1987 | Rodgers |
| 4,801,937 | A | 1/1989 | Fernandes |
| 4,855,671 | A | 8/1989 | Fernandes |
| 4,857,827 | A | 8/1989 | Zoltan |
| 4,899,103 | A | 2/1990 | Katzenstein |
| 4,904,925 | A | 2/1990 | Cavalcanti Pereira |
| 4,967,145 | A | 10/1990 | Davies |
| 5,008,612 | A | 4/1991 | Otto |
| 5,051,687 | A | 9/1991 | So |
| 5,066,904 | A | 11/1991 | Bullock |
| 5,093,770 | A | 3/1992 | Davenport |
| 5,150,270 | A | 9/1992 | Ernst |
| 5,252,911 | A | 10/1993 | Banura |
| 5,276,394 | A | 1/1994 | Mayfield |
| 5,307,008 | A | 4/1994 | So |
| 5,369,355 | A | 11/1994 | Roe |
| 5,432,439 | A | 7/1995 | Svoen |
| 5,565,765 | A | 10/1996 | Lenhard |
| 5,652,507 | A | 7/1997 | Blakely |
| 5,896,027 | A | 4/1999 | So |
| 6,028,422 | A | 2/2000 | Preusse |
| 6,177,791 | B1 | 1/2001 | Lenhard |
| 6,479,976 | B1 | 11/2002 | Edel |
| 6,590,380 | B2 | 7/2003 | Edel |
| 6,604,055 | B1 | 8/2003 | Burkett |
| 6,674,278 | B1 | 1/2004 | Uesugi |
| 6,727,791 | B2 | 4/2004 | Zhou |
| 7,075,288 | B2 | 7/2006 | Martin |
| 7,242,157 | B1 | 7/2007 | Edel |
| 7,298,141 | B2 * | 11/2007 | Bartington ............. G01R 33/04 324/253 |
| 7,525,297 | B2 | 4/2009 | Gibellini |
| 2009/0021335 | A1 * | 1/2009 | Hahn ...................... B60L 13/04 335/297 |
| 2009/0108833 | A1 * | 4/2009 | Ziegler ................ G01R 15/185 324/117 R |
| 2019/0113550 | A1 * | 4/2019 | Hong ................. G01R 33/0082 |

OTHER PUBLICATIONS

Beard; "100:1 Step-Up Amplifier-Aided Two-Stage Current Transformer with Small Ratio Errors at 60 Hz"; IEEE Transaction on Instrumentation and Measurement, vol. IM-28, No. 2; Jun. 1979; pp. 146-152.

Beard; "Single-Stage Amplifier-Aided Current Transformers Possessing Small Ratio Errors at 60 Hz"; IEEE Transaction on Instrumentation and Measurement, vol. IM-28, No. 2; Jun. 1979; pp. 141-146.

Iwanusiw; "The Measurement of Transformer Characteristics and Power Loss"; Presented at the IEEE Transformers Committee Meeting; Mar. 30, 1982; 8 pages.

Iwanusiw; "Voltage and Current Transducers for Accurate High Voltage Measurements"; published at least as early as 2009; http://iwanusiw.com/papers and articles.htm; 8 pages.

JAMB Industries; Theory of Operation; "The Amplifier Aided (Active) Current Transformer"; 1981; downloaded from http://jambindustriescom.cv.siteproject.net/Th_of_Op.htm on Jul. 10, 2012; 2 pages.

Souders; "Wide-Band Two-Stage Current Transformers of High Accuracy"; IEEE Transactions on Instrumentation and Measurement, Nov. 1972; pp. 340-345.

* cited by examiner

PRIOR ART

PRIOR ART

PRIOR ART

PRIOR ART

CURRENT TRANSFORMER WITH IMPROVED PERFORMANCE

BACKGROUND OF THE INVENTION

1. Field of the Invention

The present invention relates generally to electric power technologies, and more specifically to current transformers with improved performance.

2. Discussion of the Related Art

Various systems and processes are known in the art for current transformers with improved performance.

The field of electronics and electric power industries are associated with a branch of physics and electrical engineering that deals with the emission, behavior, and effects of electrons and electric power (e.g., using electronic devices). For instance, electric power may be produced by electric generators, supplied by sources such as electric batteries, etc. In some cases, homes, businesses, and other establishments may be provided such electric power via the electric power industry, for example, through an electric power grid.

Electronic circuits may include various individual electronic components connected by conductive wires or traces through which electric current can flow. A current transformer is a type of transformer that may be used to multiply, reduce, or measure an alternating current (AC). For instance, a current transformer may produce a current in a secondary (e.g., a secondary winding) which is proportional to the current in a primary (e.g., a primary winding). Current transformers are the current-sensing units of a power system. Current transformers may be used at electrical substations, generating stations, and in commercial and industrial electric power distribution. Moreover, current transformers may be used extensively for measuring current and monitoring the operation of the power grid.

In some aspects, the accuracy of a current transformer may depend on various factors, such as the magnetic permeability of the core material, the number of turns of the primary winding and secondary winding, the magnitude of the burden resistance, etc. In many cases, improving the accuracy of a basic current transformer (e.g., current transformers with a primary winding, a core and a secondary winding) demands incorporation additional components, inefficient designs, etc., which may increase manufacturing complexity as well as increase costs of the system. Accordingly, there is a need in the art for improved current transformer designs.

SUMMARY

An apparatus, system, and method for current transformers with improved performance are described. One or more aspects of the apparatus, system, and method include a transformer comprising a primary winding, a sense winding, and a drive winding; a first series combination comprising a current mirror coupled at a current mirror input to the sense winding; and a second series combination comprising the current mirror coupled at a current mirror output to the drive winding, wherein the current mirror is coupled to a circuit ground wherein the first series combination is coupled in parallel with the second series combination.

An apparatus, system, and method for current transformers with improved performance are described. One or more aspects of the apparatus, system, and method include a transformer comprising a primary winding, a sense winding and a drive winding; a first series combination comprising the sense winding coupled to a circuit ground; a second series combination comprising a circuit ground, a current source coupled to the circuit ground, and an output of the current source coupled to the drive winding; and a Hall-effect sensor coupled to the current source and comprising a sensor input, a sensor output, and a circuit ground, wherein the sensor input is configured to sense current in the primary winding, whereby the current source is driven by the sensor output, and generating the current source output wherein the first series combination is coupled in parallel with the second series combination.

DETAILED DESCRIPTION

Figure 1:
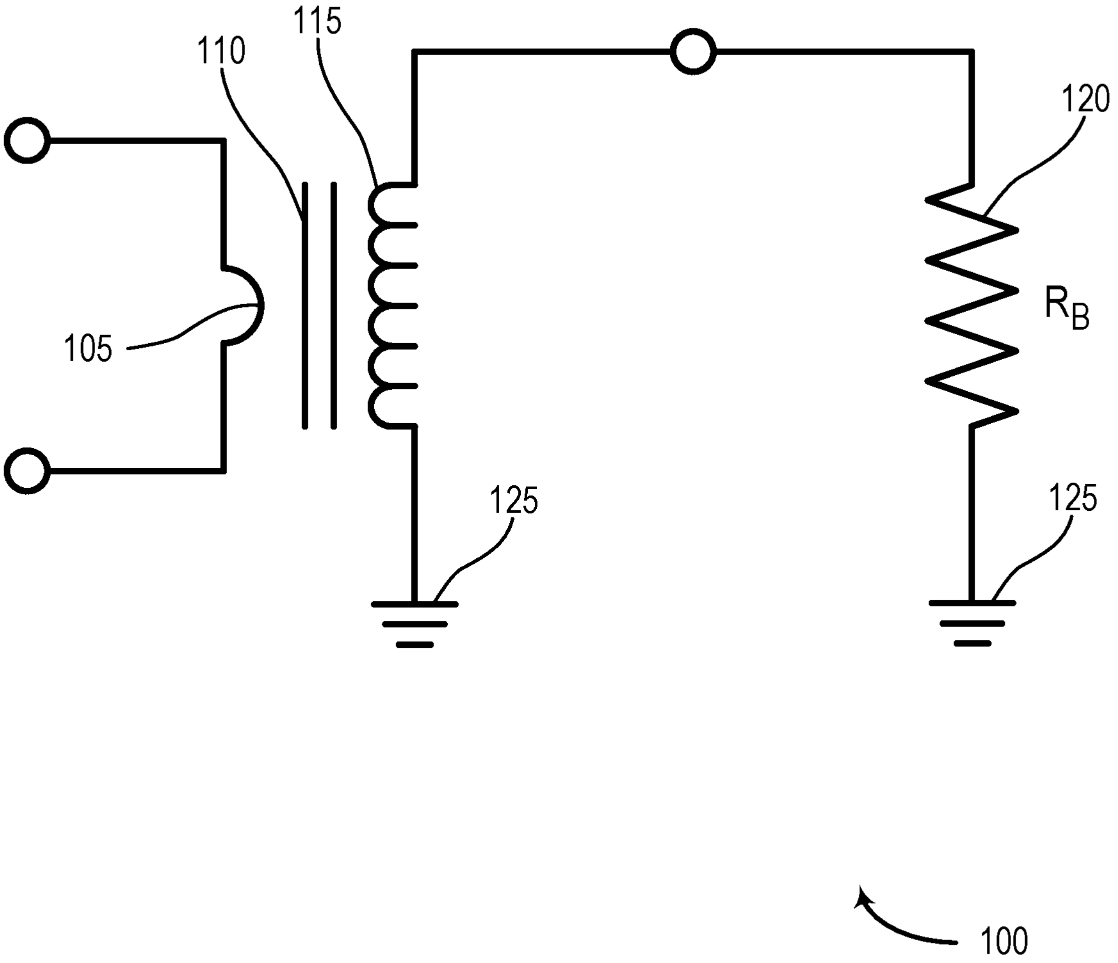
FIGS. 1 through 15 show example a current transformer designs according to one or more aspects of the present disclosure.

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

As described herein, a current transformer is a type of transformer that may be used to multiply, reduce, or measure an alternating current (AC). For instance, current transformers may be used for measuring current and monitoring the operation of a power grid (e.g., to monitor and improve operation of a power grid, which may provide electric power to homes, businesses, and other establishments).

A "basic" current transformer may include a primary winding, a core, and a secondary winding (e.g., where the primary winding may typically comprise a single turn of wire passed through the center of the device). During operation, an alternating current in the primary winding may produce an alternating magnetic field in the core, where the alternating magnetic field in the core induces an alternating current in the secondary winding. A current transformer may thus be designed to maintain a relationship (e.g., some ratio) between the primary current and the secondary current.

Accurate current transformers may be designed to maintain an accurate ratio between currents in primary and secondary windings (e.g., and accurate current transformers may demand close coupling between the primary and secondary such that the secondary current is proportional to the primary current). However, as performance (e.g., accuracy) of a current transformer improves, so may the complexity and cost of the current transformer. For instance, some current transformer implementations may have as many as a dozen cores, which may increase manufacturing complexity, increase systems costs, etc.

Accordingly, the present disclosure describes techniques and designs that may be implemented for more efficiently improving current transformer accuracy. In some aspects, described embodiments may implement usage of a current mirror to reduce current transformer error. Additionally or alternatively, some described embodiments may implement Hall-effect sensors (e.g., in place of conventional first stages in a two-stage current transformer design).

Such embodiments, as well as other described embodiments, may improve accuracy of current transformers in a more efficient manner (e.g., current transformer accuracy may be improved while reducing or minimizing additional complexity, costs, etc., as described in more detail below). For instance, one or more aspects of the present disclosure may allow, for example, 100:1 current transformer performance improvement, while being implemented with a single core and two secondary windings.

FIG. 1 shows an example of a current transformer 100 according to aspects of the present disclosure. Current transformer 100 is an example of, or includes aspects of, the corresponding element described with reference to FIGS. 2-15. In one aspect, current transformer 100 includes primary winding 105, core 110, secondary winding 115, burden resistor 120, and circuit ground 125.

FIG. 1 is an example of a simple embodiment of a current transformer, as known in the prior art. Generally, current transformers (e.g., such as current transformer 100) may be used to measure alternating currents (e.g., in the electric power industry). In some aspects, a current transformer 100 may include a primary winding 105 and a secondary winding 115, a magnetic core 110, and a burden resistor 120 (or load resistor). In some aspects, such a current transformer 100 may have a ratio (K) equal to $K=N_S/N_P$ where $N_S$ is the number of secondary turns and $N_P$ is the number of primary turns wound on the core 110.

In some cases, the ratio (K) may be expressed as an actual ratio, for example, where the numbers are the rated currents of the device. For instance, a current transformer 100 may have a single (1) turn primary and one hundred twenty (120) turn secondary for a ratio of 120, yet the current transformer 100 may be rated as, for example, a '600:5' current transformer 100 (e.g., if the current transformer 100 is intended for a rated primary current of 600 amperes (A) and a secondary current of 5 A).

In some aspects, the accuracy of a current transformer (e.g., such the current transformer 100 shown in FIG. 1) may depend on various factors, such as the magnetic permeability of the core 110 (e.g., of the core material), the number of turns of the primary winding 105 and secondary winding 115, the magnitude of the burden resistance (e.g. of the burden resistor 120), etc. In some cases, increased magnetic permeability of the core 110 material, an increased number of turns of the primary winding 105 and secondary winding 115, and reduced magnitude of the burden resistance may be desired (e.g., for improved current transformer 100 accuracy).

In some cases, a current transformer (e.g., such the "basic" current transformer 100 shown in FIG. 1) may include a single primary winding 105 and a single secondary winding 115, a single magnetic core 110, and a single burden resistor 120 or load resistor (e.g., which, in some cases, may be referred to as a 'single stage' current transformer design). Some of such current transformers 100 may have errors of, for example, the order of 1% at 50 to 60 Hz. Improved performance for a given burden may demand a higher-permeability core 110 and/or more turns (e.g., of the secondary winding 115). However, current transformers with a higher-permeability core and/or current transformers with more turns may add complexity, may add cost, may increase size and weight of the current transformer device, etc.

In some aspects, error in a current transformer 100 may arise from a 'magnetizing current.' The core 110 (e.g., a magnetic core 110) may support a magnetic flux resulting from the voltage across the secondary winding 115 caused by the secondary current flowing through the burden resistance (e.g., through the burden resistor 120). This flux demands a small net (difference) current (ampere-turns) in the windings, with the result that the output current is somewhat smaller than the input current divided by K. In various aspects, it may be desirable to reduce this flux via improved current transformer designs.

In some aspects, primary winding 105, core 110, secondary winding 115, burden resistor 120, and circuit ground 125 are each examples of, or each include aspects of, the corresponding elements described with reference to FIGS. 2-15.

Figure 2:
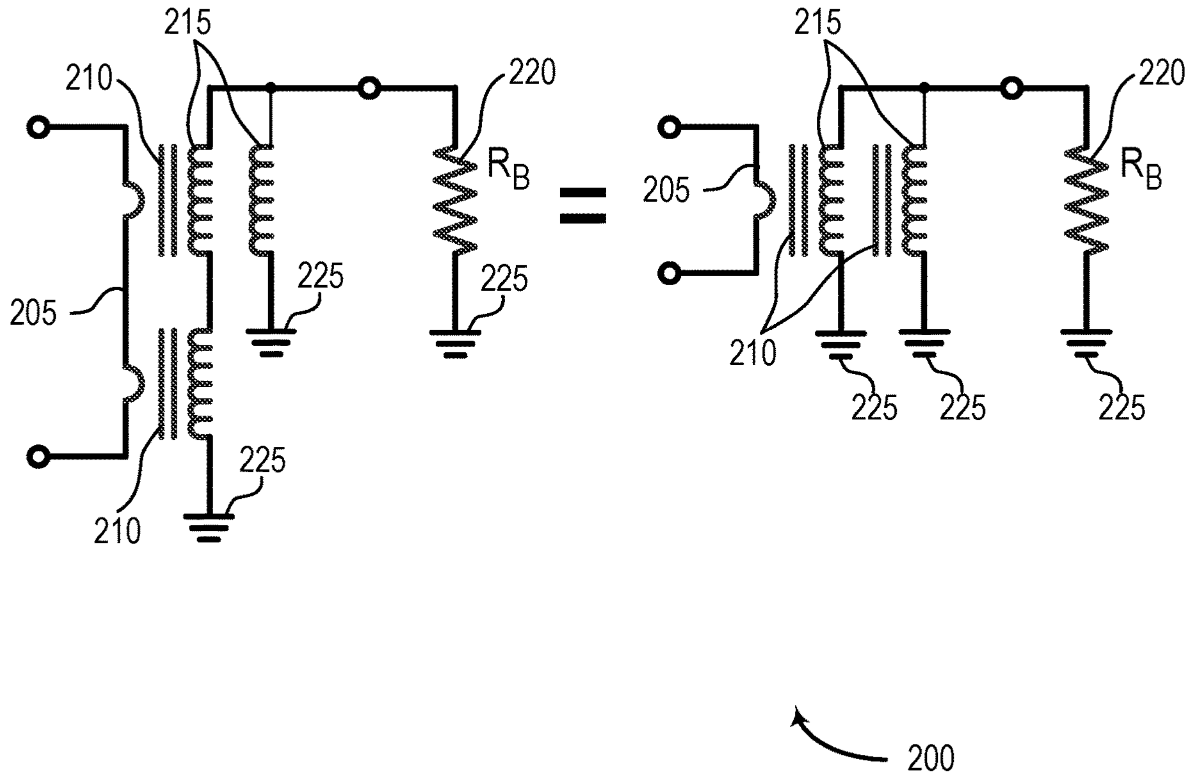

FIG. 2 shows an example of a current transformer 200 according to aspects of the present disclosure. Current transformer 200 is an example of, or includes aspects of, the corresponding element described with reference to FIGS. 1, and 3-15. In one aspect, current transformer 200 includes primary winding 205, core 210, secondary winding 215, burden resistor 220, and circuit ground 225.

FIG. 2 illustrates an embodiment of a current transformer as disclosed by Brooks in U.S. Pat. No. 1,357,197. In some examples, a current transformer 200 may be made (e.g., designed) using two cores 210, with the second core 210 having three windings and acting as a 'current comparator'. The output of the third winding may be approximately equal to the error in the first core 210 (e.g., thus correcting for that error). In some aspects, an overall error may be reduced to approximately the square of the per-stage error (e.g., around 1%; for an overall error of 0.01%). Some current transformer designs may permit the first two windings on each core 210 to be shared (e.g., which may reduce complexity).

In some aspects, primary winding 205, cores 210, secondary winding 215, burden resistor 220, and circuit ground 225 are each examples of, or each include aspects of, the corresponding elements described with reference to FIGS. 1, and 3-15.

Figure 3:
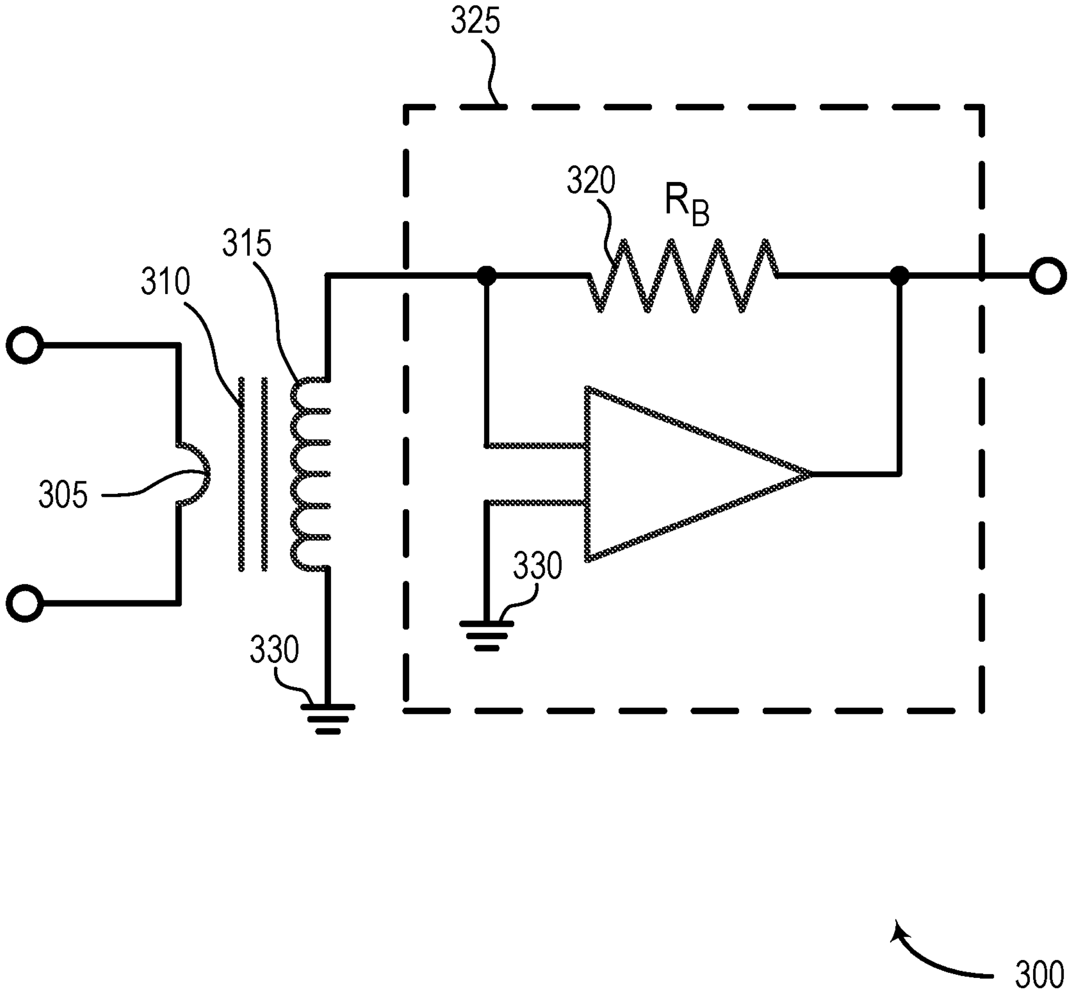

FIG. 3 shows an example of a current transformer 300 according to aspects of the present disclosure. Current transformer 300 is an example of, or includes aspects of, the corresponding element described with reference to FIGS. 1, 2, and 4-15. In one aspect, current transformer 300 includes primary winding 305, core 310, secondary winding 315, burden resistor 320, transresistance amplifier 325, and circuit ground 330.

FIG. 3 illustrates an embodiment of a current transformer as disclosed by Milkovic in U.S. Pat. No. 3,815,013. Some current transformers (e.g., such as current transformer 300) may be designed by replacing a burden resistor 320 with a transresistance amplifier 325. In some aspects, the input impedance of this amplifier is very near zero (e.g., leaving only the secondary winding 315 resistance to be driven). Depending on the design of the current transformer 300, such may yield, for example, a 10:1 reduction in error, to a fraction of a percent.

Primary winding 305, core 310, secondary winding 315, burden resistor 320, transresistance amplifier 325, and circuit ground 330 are each examples of, or each include aspects of, the corresponding elements described with reference to FIGS. 1, 2, and 4-15.

Figure 4:
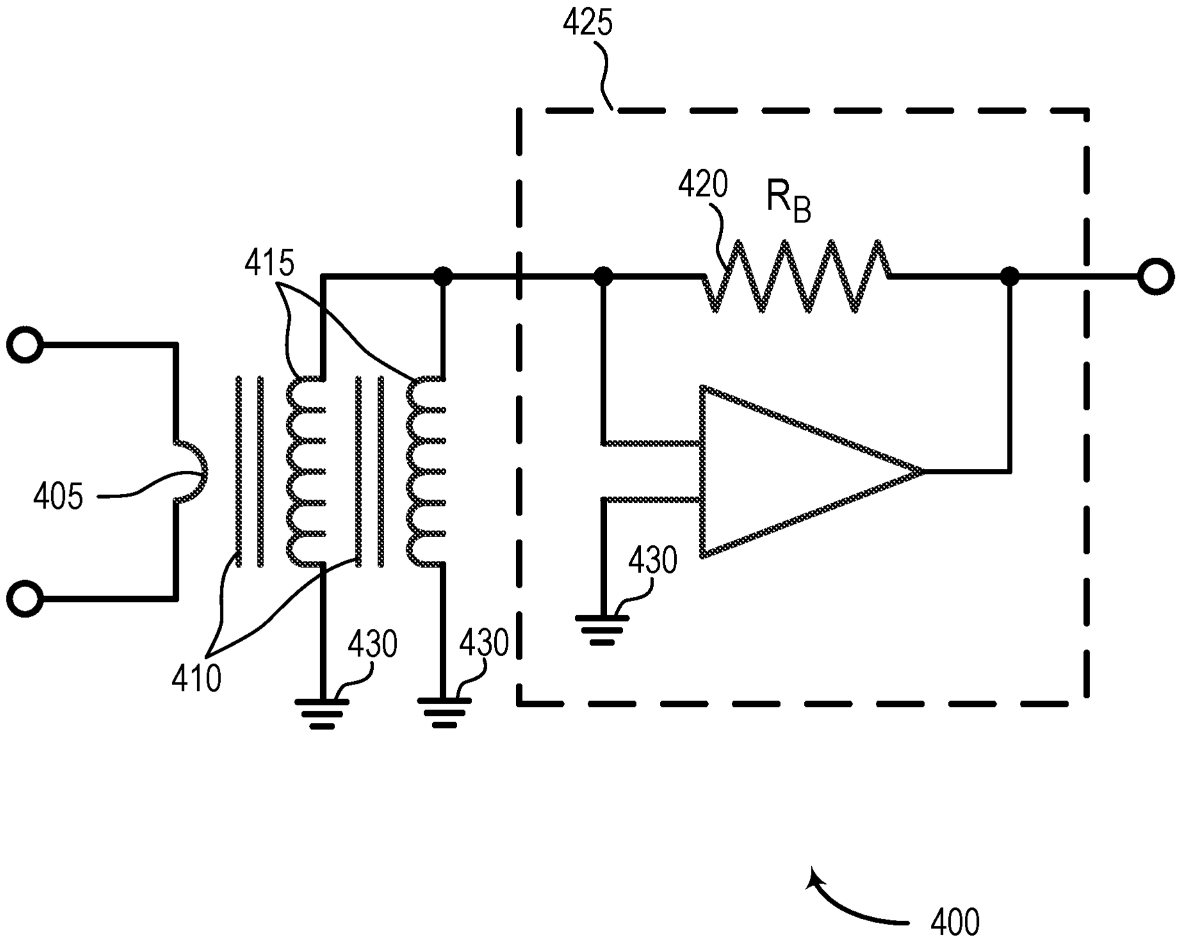

FIG. 4 shows an example of a current transformer 400 according to aspects of the present disclosure. Current transformer 400 is an example of, or includes aspects of, the corresponding element described with reference to FIGS. 1-3, and 5-15. In one aspect, current transformer 400 includes primary winding 405, cores 410, secondary windings 415, burden resistor 420, transresistance amplifier 425, and circuit ground 430.

In some cases, aspects of the current transformers described with reference to FIGS. 1 through 3 may be combined, for example, yielding performance measured in the tens of parts per million (ppm); 10 ppm=0.001% (e.g., aspects of which may be shown and described with reference to current transformer 400).

Some current transformers (e.g., such as 'amplifier-aided' current transformers) may make use of, or may include, a 'normal' burden resistor. Generally, without one or more aspects of the techniques described herein, as performance of a current transformer improves, so does the complexity of the current transformer design (e.g., which increases manufacturing complexity, cost, etc.). For instance, some current transformers may have as many as a dozen cores.

In some aspects, primary winding 405, cores 410, secondary windings 415, burden resistor 420, transresistance amplifier 425, and circuit ground 430 are each examples of, or each include aspects of, the corresponding elements described with reference to FIGS. 1-3, and 5-15.

Figure 5:
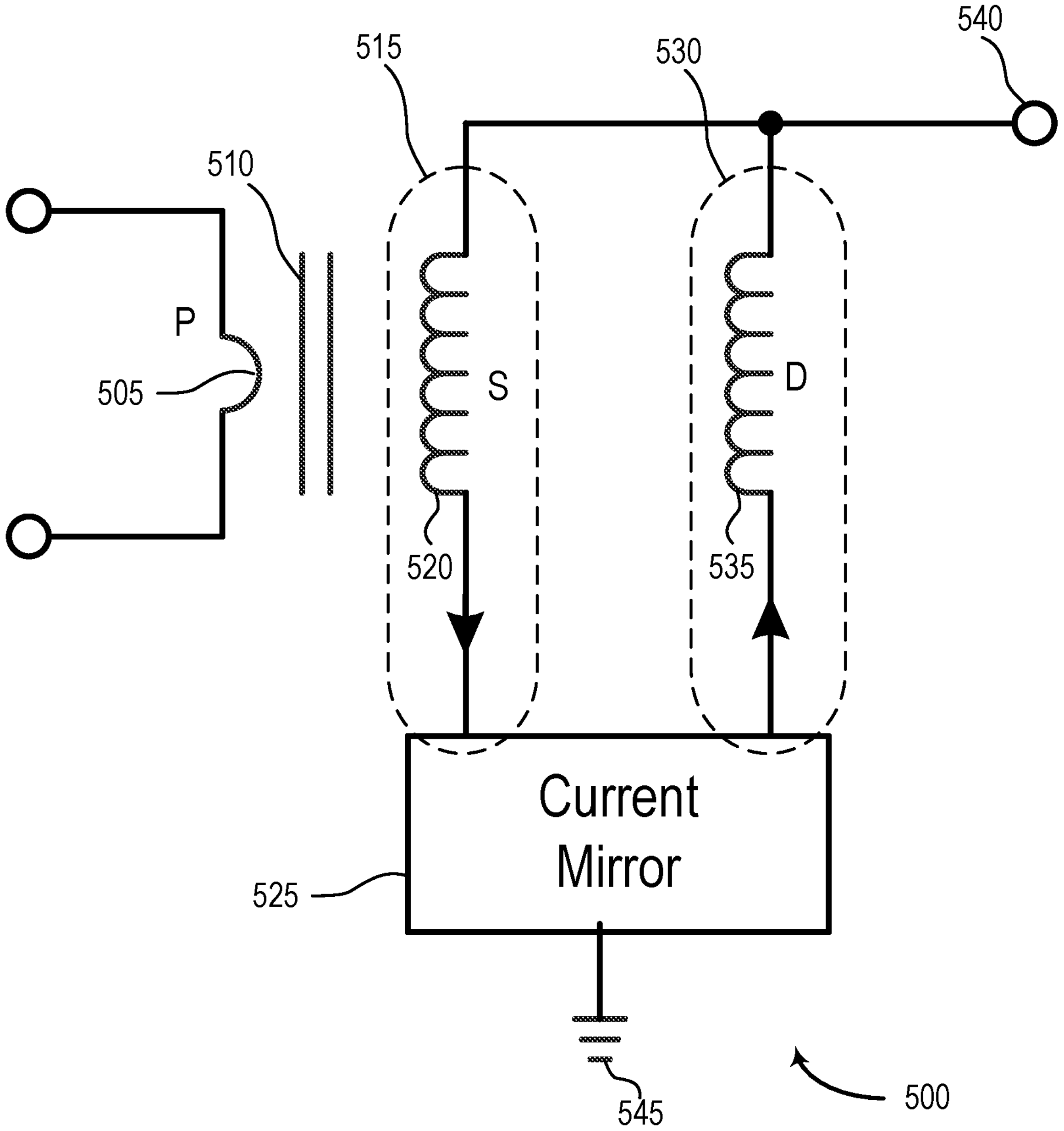

FIG. 5 shows an example of a current transformer 500 according to aspects of the present disclosure. Current transformer 500 is an example of, or includes aspects of, the corresponding element described with reference to FIGS. 1-4, and 6-15. In one aspect, current transformer 500 includes primary winding 505, core 510, first series combination 515, second series combination 530, output 540, and circuit ground 545. In one aspect, first series combination 515 includes sense winding 520 and current mirror 525. In one aspect, second series combination 530 includes drive winding 535 and current mirror 525.

In some examples, an apparatus (e.g., current transformer 500) may include a transformer comprising a primary winding 505, a sense winding 520, and a drive winding 535. As described in more detail herein, the apparatus (e.g., current transformer 500) may include a first series combination 515 and a second series combination 530. In the example of FIG. 5, the first series combination 515 comprises a current mirror 525 coupled at a current mirror 525 input to the sense winding 520, and the second series combination 530 comprises the current mirror 525 coupled at a current mirror 525 output to the drive winding 535. In some aspects, the current mirror 525 is coupled to a circuit ground (e.g., as described in more detail herein, for example, with reference to FIGS. 6 and 9-12). In some aspects, the first series combination 515 is coupled in parallel with the second series combination 530.

Generally, a current mirror (e.g., a current mirror 525) may be a device that accepts an input current and generates a 'mirror copy' of that current. A current mirror 525 may have a ratio of 1:1 or some other ratio.

Figure 6:
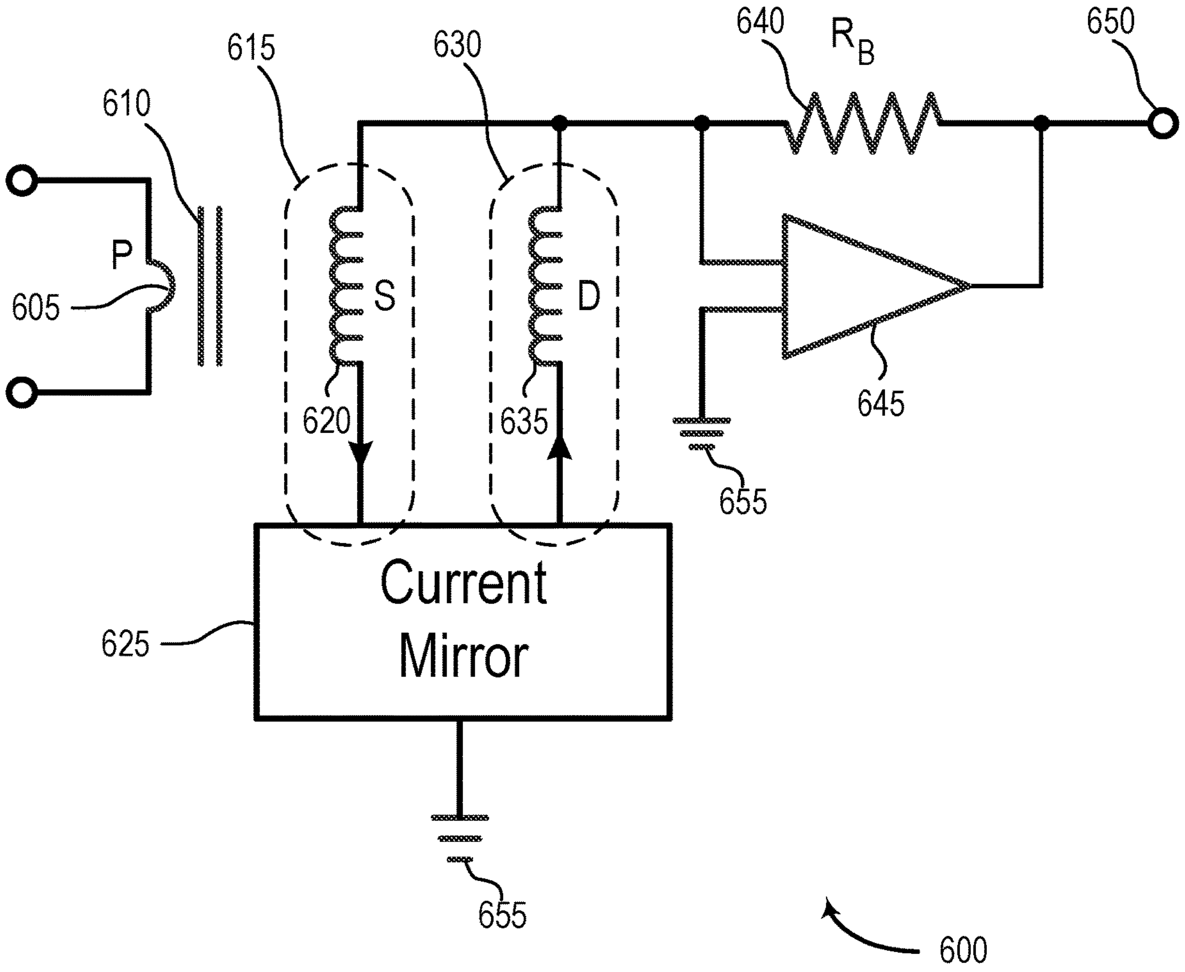

In some embodiments, a current transformer 500 may include a current mirror 525. In some examples, a current mirror 525 may have a ratio of 1:100. That is, for an input current of one, a current mirror 525 may produce an output current of 100. For instance, as shown in FIGS. 5 and 6, the output of a current mirror 525 drives a drive winding 535 on the core 510 with one hundred (100) times the current in the sense winding 520. This reduces the current in the sense winding 520 (e.g., by a factor of 101), which may reduce the magnetizing current requirement and thus the error accordingly.

In some aspects, primary winding 505, core 510, first series combination 515, sense winding 520, current mirror 525, second series combination 530, drive winding 535, current mirror 525, output 540, and circuit ground 545 are each examples of, or each include aspects of, the corresponding elements described with reference to FIGS. 1-4, and 6-15.

FIG. 6 shows an example of a current transformer 600 according to aspects of the present disclosure. Current transformer 600 is an example of, or includes aspects of, the corresponding element described with reference to FIGS. 1-5, and 7-15. In one aspect, current transformer 600 includes primary winding 605, core 610, first series combination 615, second series combination 630, burden resistor 640, operational amplifier 645, output 650, and circuit ground 655. In one aspect, first series combination 615 includes sense winding 620 and current mirror 625. In one aspect, second series combination 630 includes drive winding 635 and current mirror 625.

As described herein, in some examples, current transformer 600 may further include an operational amplifier 645 and a burden resistor 640. The operational amplifier 645 may comprise an inverting amplifier input, a non-inverting amplifier input, and an amplifier output. In some aspects, one of the operational amplifier 645 inputs (e.g., one of the inverting amplifier input and the non-inverting amplifier input) is coupled to the circuit ground 655 and the other amplifier input is coupled to the drive winding 635 and to the sense winding 620 (e.g., such that the amplifier inputs are coupled in parallel with the first series combination 615 and the second series combination 630). In some examples, the burden resistor 640 is coupled between the other amplifier input and the amplifier output.

In some examples, a current mirror ratio is significantly greater than one (e.g., in some cases, the current mirror 625 of FIG. 6 is configured with a current ratio of within a range of 75-250). In some aspects, the example of FIG. 6 shows use of a transresistance amplifier to support the output voltage (e.g., though in some cases, a burden resistor 640 could also be used).

In some aspects, primary winding 605, core 610, first series combination 615, sense winding 620, current mirror 625, second series combination 630, drive winding 635, current mirror 625, burden resistor 640, operational amplifier 645, output 650, and circuit ground 655 are each examples of, or each include aspects of, the corresponding elements described with reference to FIGS. 1-5, and 7-15.

Figure 7:
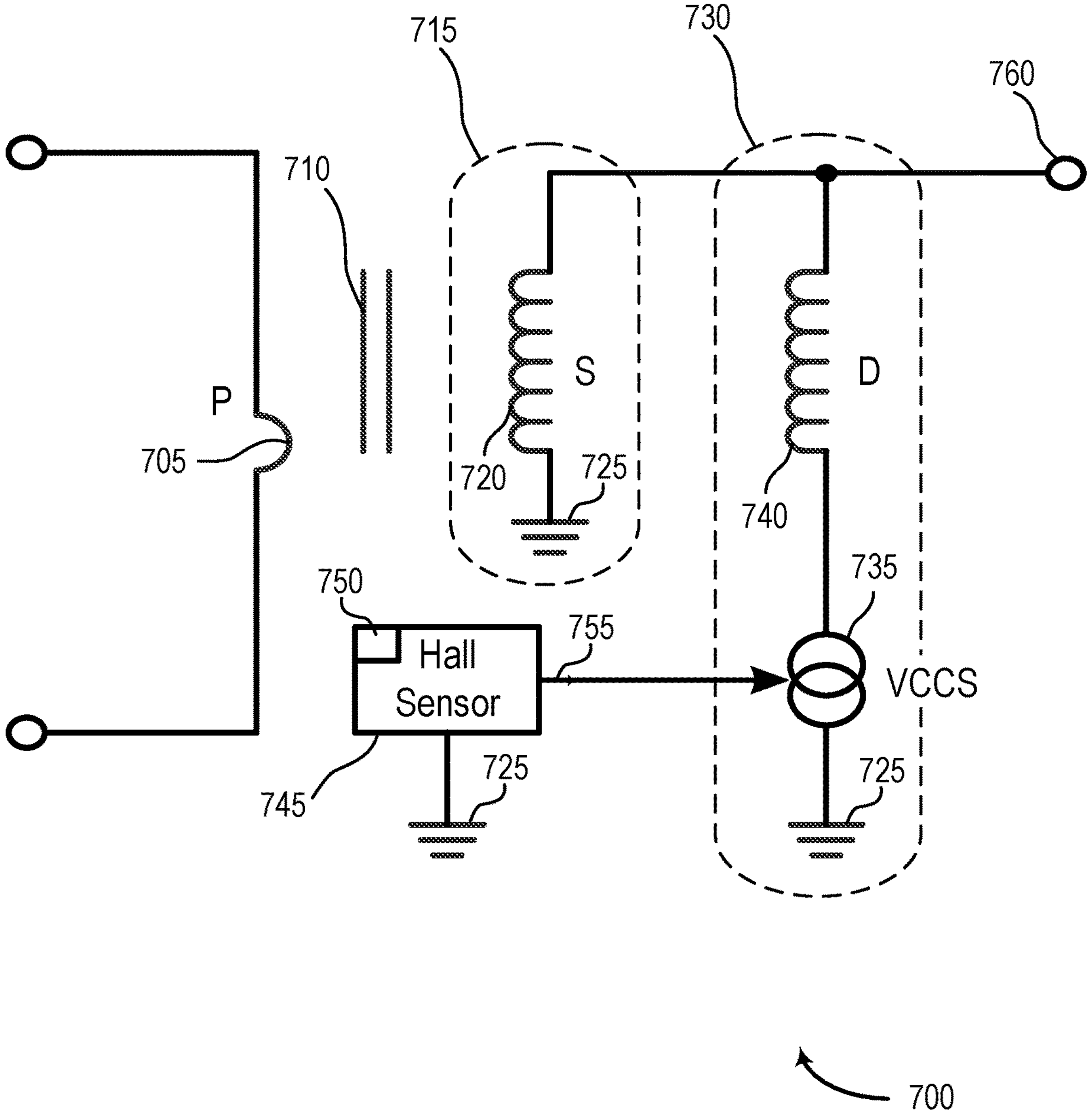

FIG. 7 shows an example of a current transformer 700 according to aspects of the present disclosure. Current transformer 700 is an example of, or includes aspects of, the corresponding element described with reference to FIGS. 1-6, and 8-15. In one aspect, current transformer 700 includes primary winding 705, core 710, first series combination 715, second series combination 730, Hall-effect sensor 745, and output 760. In one aspect, first series combination 715 includes sense winding 720 and circuit ground 725. In one aspect, second series combination 730 includes circuit ground 725, current source 735, and drive winding 740. In one aspect, Hall-effect sensor 745 includes sensor input 750, sensor output 755, and circuit ground 725.

As described herein, in some examples, an apparatus (e.g., current transformer 700) may include a transformer comprising a primary winding 705, a sense winding 720 and a drive winding 740. As described in more detail herein, an apparatus (e.g., current transformer 700) may include a first series combination 715, a second series combination 730, and a Hall-effect sensor 745. In the example of FIG. 7, the first series combination 715 comprises the sense winding 720 coupled to a circuit ground 725. The second series combination 730 comprises the circuit ground 725, a current source 735 coupled to the circuit ground 725, and an output of the current source 735 coupled to the drive winding 740. Further, the Hall-effect sensor 745 may be coupled to the current source 735 and may comprise a sensor input 750, a sensor output 755, and the circuit ground 725. In some aspects, the sensor input 750 may be configured to sense current in the primary winding 705, whereby the current source 735 is driven by the sensor output 755, and generate the current source 735 output. In some aspects, the first series combination 715 is coupled in parallel with the second series combination 730.

A Hall-effect sensor 745 may generate a voltage proportional to magnetic flux. By placing a Hall-effect sensor 745 near a conductor carrying a current, a Hall-effect sensor 745 can be made to generate an output voltage proportional to that current (e.g., because a current-carrying conductor generates a proportional magnetic flux). In some cases, the performance of Hall-effect sensors 745 alone may be adequate for current measurements.

Figure 8:
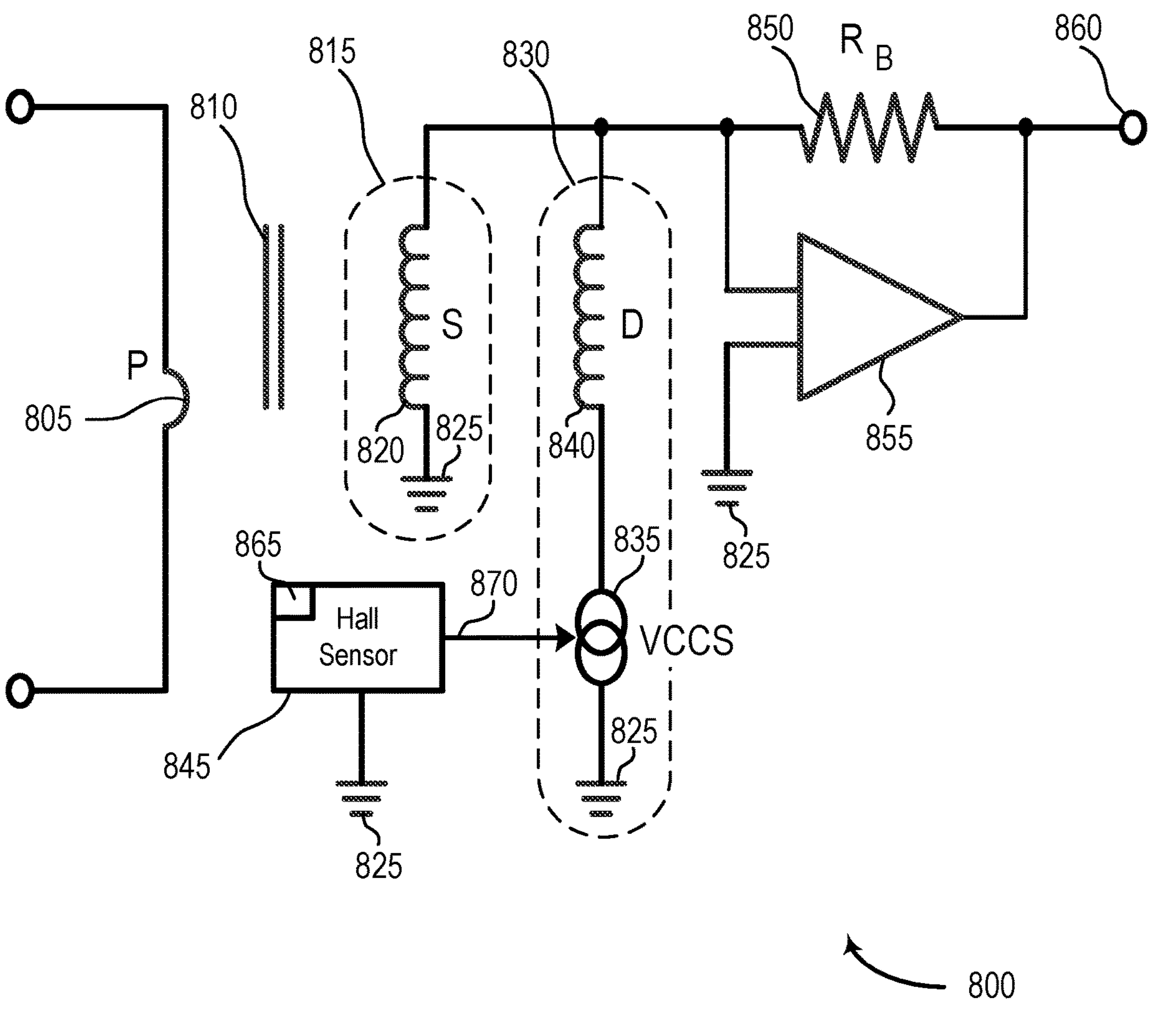

However, by applying the output voltage of the Hall-effect sensor 745 to a voltage-controlled current source 735 (e.g., as shown in FIGS. 7 and 8) and by adjusting the gain of the current source 735 so as to result in a current approximately equal to $I_{IN}/K$, where $I_{IN}$ is the current in the primary winding and $K=N_S/N_P$, where $N_S$ is the number of sense (secondary winding turns and $N_P$ is the number of primary winding turns, the required current in the sense winding 720 (and the resulting error) may be greatly reduced. Design considerations along with the stability of Hall-effect sensors 745 may provide for improvements (e.g., on the order of 100:1). In some examples, the core 710 may be used as a current comparator.

Primary winding 705, core 710, first series combination 715, sense winding 720, circuit ground 725, second series combination 730, circuit ground 725, current source 735, drive winding 740, hall-effect sensor 745, sensor output 755, circuit ground 725, and output 760 are each examples of, or each include aspects of, the corresponding elements described with reference to FIGS. 1-6, and 8-15.

FIG. 8 shows an example of a current transformer 800 according to aspects of the present disclosure. Current transformer 800 is an example of, or includes aspects of, the corresponding element described with reference to FIGS. 1-7, and 9-15. In one aspect, current transformer 800 includes primary winding 805, core 810, first series combination 815, second series combination 830, Hall-effect sensor 845, burden resistor 850, operational amplifier 855, and output 860. In one aspect, first series combination 815 includes sense winding 820 and circuit ground 825. In one aspect, second series combination 830 includes circuit ground 825, current source 835, and drive winding 840. In one aspect, Hall-effect sensor 845 includes sensor input 865, sensor output 870, and circuit ground 825.

As described herein, in some examples, current transformer 800 may include an operational amplifier 855 and a burden resistor 850. For instance, an operational amplifier 855 may comprise an inverting amplifier input, a non-inverting amplifier input, and an amplifier output. In some aspects, one of the amplifier inputs (e.g., one of the inverting amplifier input or the non-inverting amplifier input) may be coupled to the circuit ground 825. In some aspects, the other amplifier input is coupled to the drive winding 840 and to the sense winding 820 (e.g., such that the amplifier inputs are coupled in parallel with the first series combination 815 and the second series combination 830). In some implementations, the burden resistor 850 may be coupled between the other amplifier input and the amplifier output.

In some cases, Hall-effect sensors 845 may have other errors, for example, including nonlinearity (distortion) and noise. One or more aspects of the techniques and designs described herein (e.g., with reference to FIGS. 7 and 8) may result in the cancellation of such errors (e.g., with ~99% effectiveness). Thus, the overall performance of a Hall-effect sensor 845 hybrid current transformer design (e.g., aspects of which are described in detail with reference to, for example, the current transformer 700 and the current transformer 800 of FIGS. 7 and 8) may be around 0.01% or 100 ppm. Such current transformer designs may also have the benefit of making the overall current transformer DC-coupled, which reduces the likelihood of core saturation from a DC component on the input current.

In some aspects, a physical configuration of a Hall-effect sensor 845 may depend on the current being sensed. For instance, if the current is large enough, placing a Hall-effect sensor 845 on or near the current-carrying conductor may generate an adequate output signal. When designing for instrumentation-level currents of 1 to 10 amperes, it may be advantageous to use a second magnetic core 810 with an air gap, with the sensor placed in the gap. Such cores 810 may be used with Hall-effect sensors 845 for current measurement (e.g., and may be available at relatively low cost).

In some aspects, primary winding 805, core 810, first series combination 815, sense winding 820, circuit ground 825, second series combination 830, circuit ground 825, current source 835, drive winding 840, Hall-effect sensor 845, burden resistor 850, operational amplifier 855, output 860, sensor input 865, and sensor output 870 are each examples of, or each include aspects of, the corresponding elements described with reference to FIGS. 1-7, and 9-15.

Figure 9:
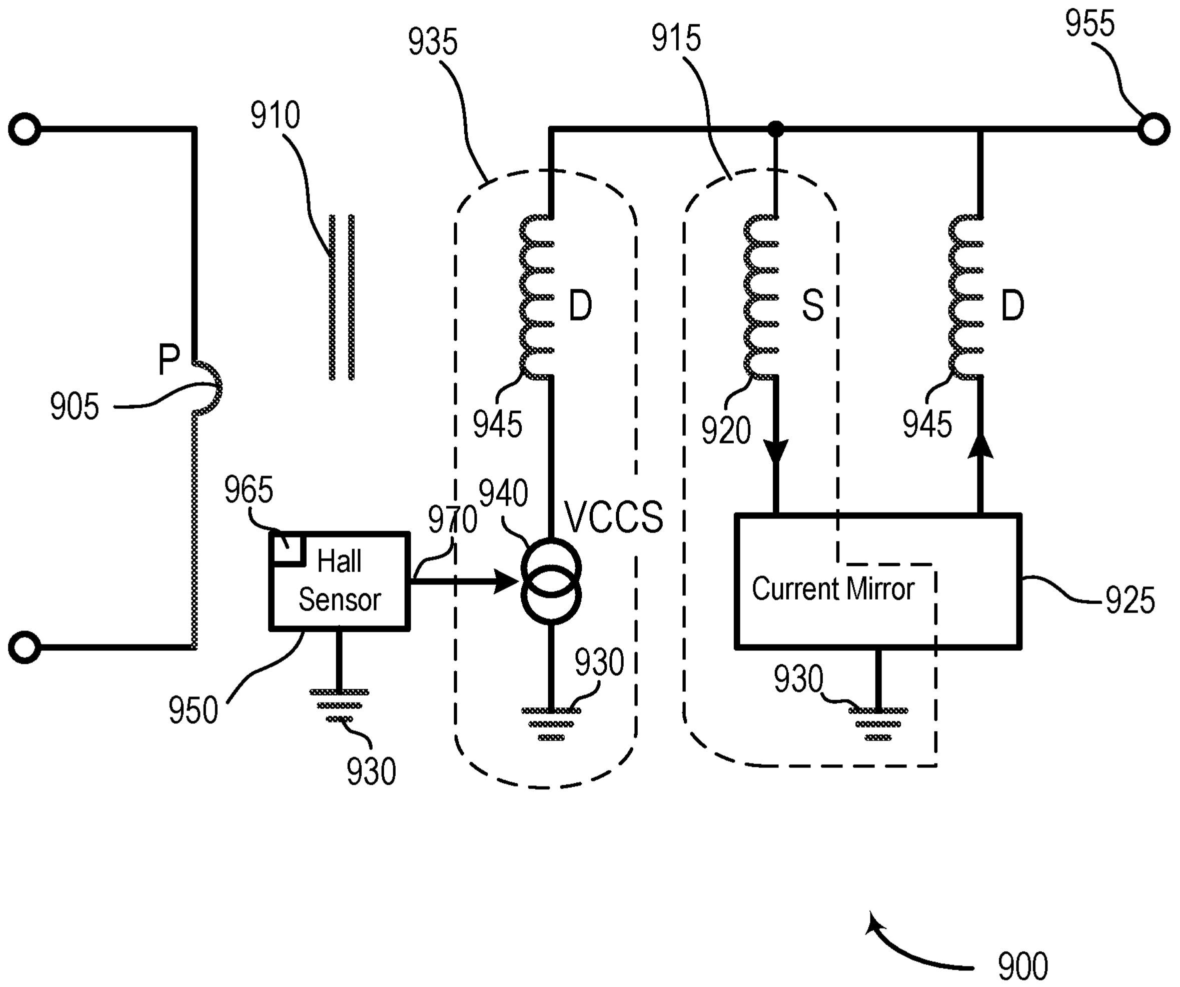

FIG. 9 shows an example of a current transformer 900 according to aspects of the present disclosure. Current transformer 900 is an example of, or includes aspects of, the corresponding element described with reference to FIGS. 1-8, and 10-15. In one aspect, current transformer 900 includes primary winding 905, core 910, first series combination 915, second series combination 935, Hall-effect sensor 950, drive windings 945, and output 955. In one aspect, first series combination 915 includes sense winding 920, current mirror 925, and circuit ground 930. In one aspect, second series combination 935 includes circuit ground 930, current source 940, and drive winding 945. In one aspect, Hall-effect sensor 950 includes sensor input 965, sensor output 970, and circuit ground 930.

As described herein, in some examples, a current transformer 900 may include another drive winding 945 (e.g., the transformer may include a second drive winding 945) and a current mirror 925. For instance, a current mirror 925 may be coupled at a current mirror 925 input to the sense winding 920 (e.g., where the first series combination 915 comprises the current mirror 925). In some aspects, the current mirror 925 is coupled to the circuit ground 930 such that the current mirror 925 input is interposed between the sense winding 920 and the circuit ground 930. Further, in some implementations, a current mirror output of the current mirror 925 may be coupled to the other drive winding 945.

Figure 10:
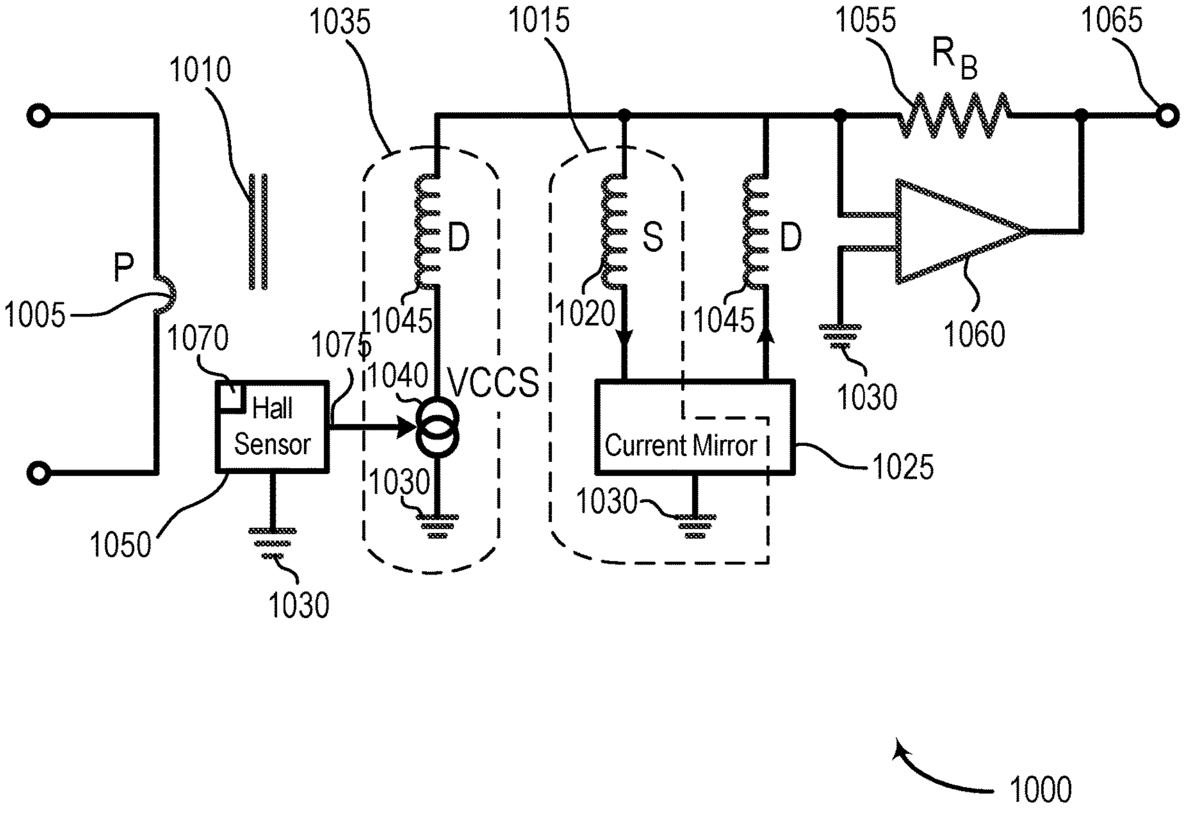

One or more aspects of embodiments described with reference to FIGS. 5 through 9 may be used together, for example, as shown in FIGS. 9 and 10. For instance, a current transformer design (e.g., current transformer 900) may include a Hall-effect sensor 950 driving a drive winding 945 (e.g., with ~1% error). Error may be sensed by a circuit (e.g., aspects of which are shown in FIGS. 5 and 6, for example) where 99% of the Hall error may be carried by the current mirror 925 and sense winding 920, and the remaining 1% (e.g., being 0.01% of the total current) may be carried by the other drive winding 945. Thus, in such an example, an overall error of ~0.0001% or 1 ppm may be realized.

In some aspects, primary winding 905, core 910, first series combination 915, sense winding 920, current mirror 925, circuit ground 930, second series combination 935, circuit ground 930, current source 940, drive windings 945, Hall-effect sensor 950, sensor input 965, and sensor output 970 and output 955 are each examples of, or each include aspects of, the corresponding elements described with reference to FIGS. 1-8, and 10-15.

FIG. 10 shows an example of a current transformer 1000 according to aspects of the present disclosure. Current transformer 1000 is an example of, or includes aspects of, the corresponding element described with reference to FIGS. 1-9, and 11-15. In one aspect, current transformer 1000 includes primary winding 1005, core 1010, first series combination 1015, second series combination 1035, Hall-effect sensor 1050, drive windings 1045, burden resistor 1055, operational amplifier 1060, sensor input 1070, sensor output 1075 and output 1065. In one aspect, first series combination 1015 includes sense winding 1020, current mirror 1025, and circuit ground 1030. In one aspect, second series combination 1035 includes circuit ground 1030, current source 1040, and drive winding 1045. In one aspect, Hall-effect sensor 1050 includes sensor input 1070, sensor output 1075, and circuit ground 1030.

As described herein, in some examples, current transformer 1000 may include an operational amplifier 1060 and a burden resistor 1055. For instance, the operational amplifier 1060 may comprise an inverting amplifier input, a non-inverting amplifier input, and an amplifier output. In some aspects, one of the amplifier inputs is coupled to the circuit ground 1030 and the other amplifier input is coupled to the drive winding 1045 and the sense winding 1020 (e.g., such that the amplifier inputs are coupled in parallel with the first series combination 1015 and the second series combination 1035). Further, the burden resistor 1055 may be coupled between the other amplifier input and the amplifier output.

In some aspects, primary winding 1005, core 1010, first series combination 1015, sense winding 1020, current mirror 1025, circuit ground 1030, second series combination 1035, circuit ground 1030, current source 1040, drive windings 1045, Hall-effect sensor 1050, burden resistor 1055, operational amplifier 1060, sensor input 1070, sensor output 1075, and output 1065 are each examples of, or each include aspects of, the corresponding elements described with reference to FIGS. 1-9, and 11-15.

Figure 11:
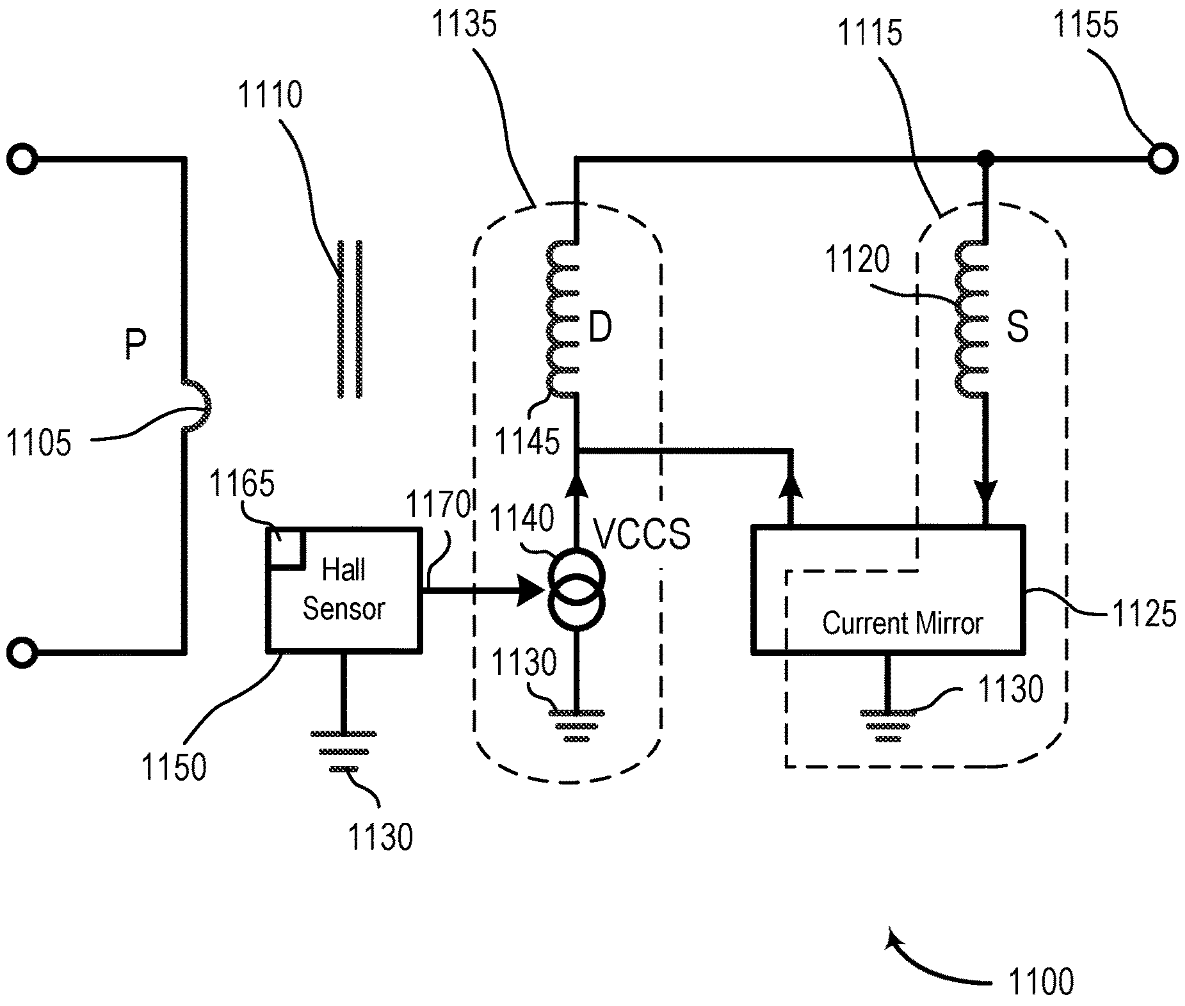

FIG. 11 shows an example of a current transformer 1100 according to aspects of the present disclosure. Current transformer 1100 is an example of, or includes aspects of, the corresponding element described with reference to FIGS. 1-10, and 12-15. In one aspect, current transformer 1100 includes primary winding 1105, core 1110, first series combination 1115, second series combination 1135, Hall-effect sensor 1150, and output 1155. In one aspect, first series combination 1115 includes sense winding 1120, current mirror 1125, and circuit ground 1130. In one aspect, second series combination 1135 includes circuit ground 1130, current source 1140, and drive winding 1145. In one aspect, Hall-effect sensor 1150 includes sensor input 1165, sensor output 1170, and circuit ground 1130.

As described herein, in some examples, current transformer 1100 may include a current mirror 1125. The current mirror 1125 may be coupled at a current mirror 1125 input to the sense winding 1120. In some aspects, the first series comprises the current mirror 1125, and the current mirror 1125 is interposed between the sense winding 1120 and the circuit ground 1130. Further, in some cases, a current mirror output of the current mirror 1125 may be coupled in parallel with the current source 1140 such that an output of the current mirror 1125 flows through the drive winding 1145.

One or more embodiments described herein (e.g., with reference to FIGS. 11 and 12) may include combining outputs of a Hall-effect current source 1140 and a current mirror 1125. For instance, outputs of the Hall-effect current source 1140 and the current mirror 1125 may be combined and may be applied together to a single drive winding 1145 (e.g., now carrying 99.99% of the output current). In some aspects, current transformer designs of FIGS. 11 and 12 (e.g., current transformer 1100 and current transformer 1200) may have similar performance as current transformer designs described with reference to FIGS. 9 and 10 (e.g., where current transformer designs of FIGS. 11 and 12 implement a single core 1110 with two windings, which may simplify the design for manufacturing and cost reduction).

In some aspects, primary winding 1105, core 1110, first series combination 1115, sense winding 1120, current mirror 1125, circuit ground 1130, second series combination 1135, circuit ground 1130, current source 1140, drive winding 1145, Hall-effect sensor 1150, sensor input 1165, sensor output 1170, and output 1155 are each examples of, or each include aspects of, the corresponding elements described with reference to FIGS. 1-10, and 12-15.

Figure 12:
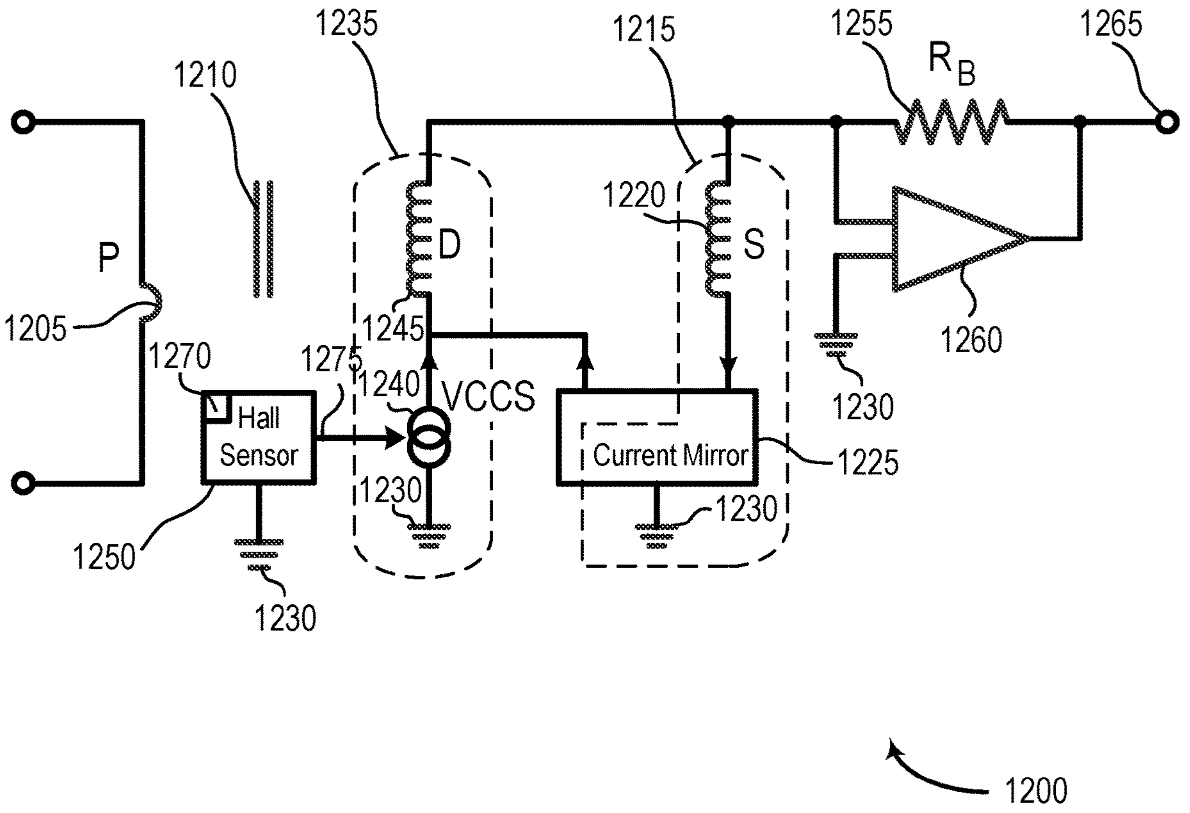

FIG. 12 shows an example of a current transformer 1200 according to aspects of the present disclosure. Current transformer 1200 is an example of, or includes aspects of, the corresponding element described with reference to FIGS. 1-11, and 13-15. In one aspect, current transformer 1200 includes primary winding 1205, core 1210, first series combination 1215, second series combination 1235, Hall-effect sensor 1250, burden resistor 1255, operational amplifier 1260, and output 1265. In one aspect, first series combination 1215 includes sense winding 1220, current mirror 1225, and circuit ground 1230. In one aspect, second series combination 1235 includes circuit ground 1230, current source 1240, and drive winding 1245. In one aspect, Hall-effect sensor 1250 includes sensor input 1270, sensor output 1275, and circuit ground 1230.

As described herein, in some examples, current transformer 1200 may include an operational amplifier 1260 and a burden resistor 1255. In some cases, the operational amplifier 1260 may comprise an inverting amplifier input, a non-inverting amplifier input, and an amplifier output. In some aspects, one of the amplifier inputs may be coupled to the circuit ground 1230 and the other amplifier input may be coupled to the drive winding 1245 and the sense winding 1220 (e.g., such that the amplifier inputs are coupled in parallel with the first series combination 1215 and the second series combination 1235). In some implementations, the burden resistor 1255 is coupled between the other amplifier input and the amplifier output.

In some aspects, primary winding 1205, core 1210, first series combination 1215, sense winding 1220, current mirror 1225, circuit ground 1230, second series combination 1235, circuit ground 1230, current source 1240, drive winding 1245, Hall-effect sensor 1250, burden resistor 1255, operational amplifier 1260, sensor input 1270, sensor output 1275, and output 1265 are each examples of, or each include aspects of, the corresponding elements described with reference to FIGS. 1-11, and 13-15.

Figure 13:
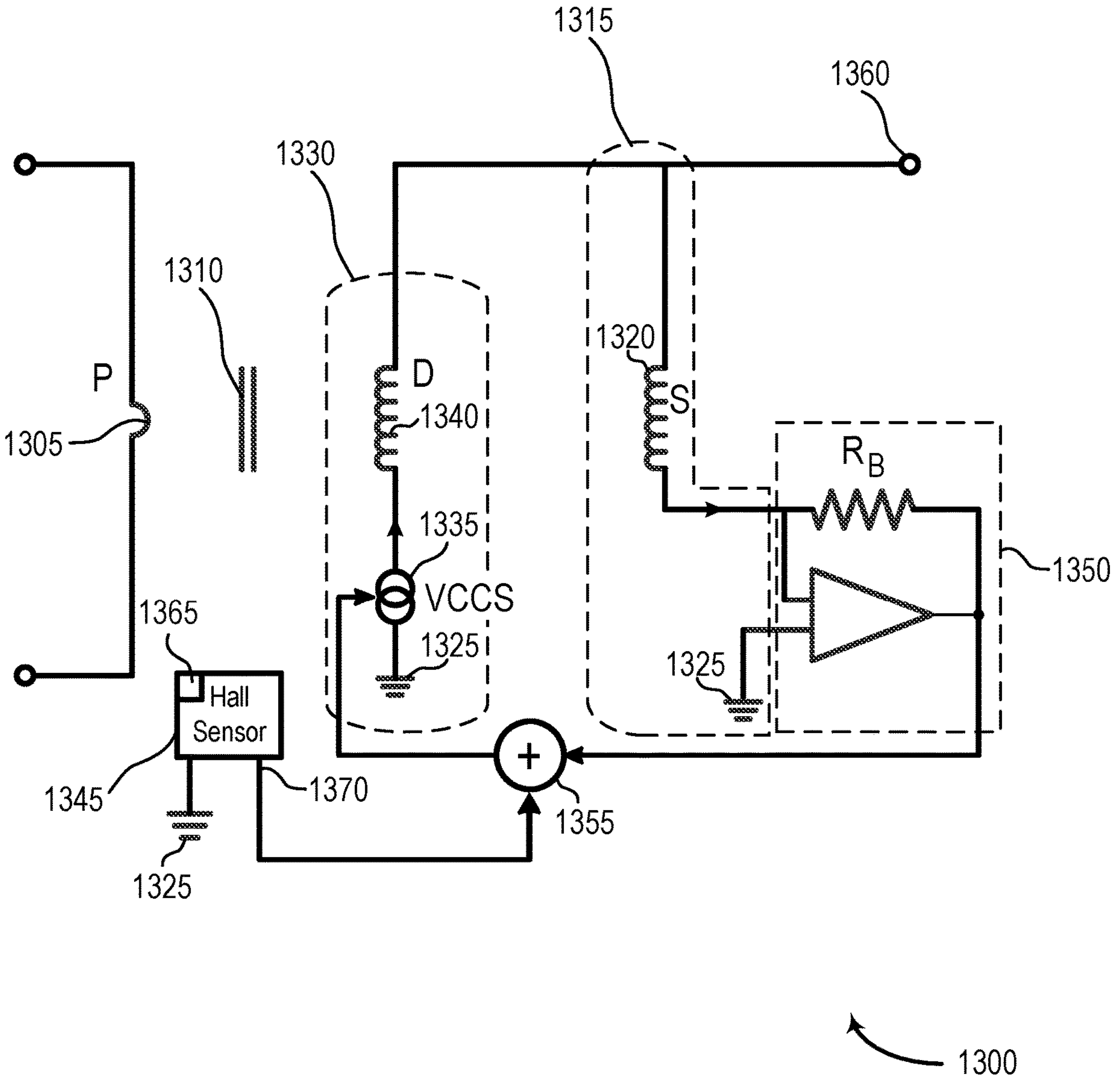

FIG. 13 shows an example of a current transformer 1300 according to aspects of the present disclosure. Current transformer 1300 is an example of, or includes aspects of, the corresponding element described with reference to FIGS. 1-12, 14, and 15. In one aspect, current transformer 1300 includes primary winding 1305, core 1310, first series combination 1315, second series combination 1330, Hall-effect sensor 1345, transresistance amplifier 1350, summing node 1355, and output 1360. In one aspect, first series combination 1315 includes sense winding 1320 and circuit ground 1325. In one aspect, second series combination 1330 includes circuit ground 1325, current source 1335, and drive winding 1340. In one aspect, Hall-effect sensor 1345 includes sensor input 1365, sensor output 1370, and circuit ground 1325.

As described herein, in some examples, current transformer 1300 may include a transresistance amplifier 1350 and a summing node 1355. For instance, the transresistance amplifier 1350 may include an inverting amplifier input, a non-inverting amplifier input, and an amplifier output. In some aspects, one of the amplifier inputs is coupled to the circuit ground 1325 and the other amplifier input is coupled to the sense winding 1320 at the transresistance amplifier 1350 input. Further, the summing node 1355 may be coupled to the transresistance amplifier 1350 output and may be interposed between the Hall-effect sensor 1345 and the current source 1335. In some aspects, the summing node 1355 may be configured to add an output voltage of the Hall-effect sensor 1345 and an output voltage of the transresistance amplifier 1350. In some cases, the current resulting from the adding of the voltages (e.g., the current resulting from the added output voltages from the Hall-effect sensor 1345 and the transresistance amplifier 1350) may flow through the drive winding 1340. In some examples, a first output 1360 may be coupled in series with the first series combination 1315.

In some aspects, primary winding 1305, core 1310, first series combination 1315, sense winding 1320, circuit ground 1325, second series combination 1330, circuit ground 1325, current source 1335, drive winding 1340, Hall-effect sensor 1345, transresistance amplifier 1350, summing node 1355, sensor input 1365, sensor output 1370, and output 1360 are each examples of, or each include aspects of, the corresponding elements described with reference to FIGS. 1-12, 14, and 15.

Figure 14:
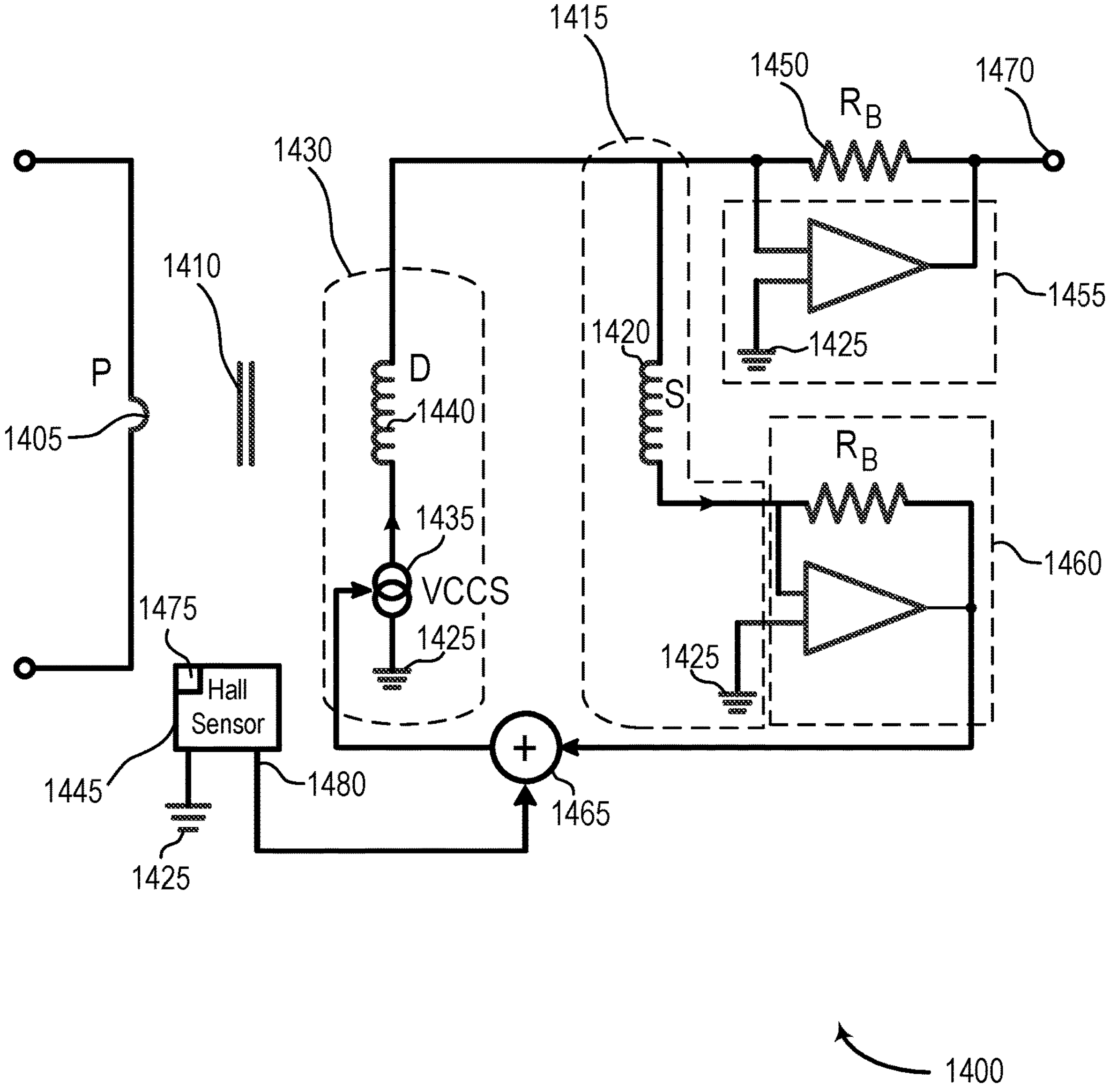

FIG. 14 shows an example of a current transformer 1400 according to aspects of the present disclosure. Current transformer 1400 is an example of, or includes aspects of, the corresponding element described with reference to FIGS. 1-13, and 15. In one aspect, current transformer 1400 includes primary winding 1405, core 1410, first series combination 1415, second series combination 1430, Hall-effect sensor 1445, burden resistor 1450, operational amplifier 1455, transresistance amplifier 1460, summing node 1465, and output 1470. In one aspect, first series combination 1415 includes sense winding 1420 and circuit ground 1425. In one aspect, second series combination 1430 includes circuit ground 1425, current source 1435, and drive winding 1440. In one aspect, Hall-effect sensor 1445 includes sensor input 1475, sensor output 1480, and circuit ground 1425.

As described herein, in some examples, current transformer 1400 may include an operational amplifier 1455 and a burden resistor 1450. For instance, an operational amplifier 1455 may include a second inverting amplifier input, a second non-inverting amplifier input, and a second amplifier output. In some aspects, one of the second amplifier inputs may be coupled to the circuit ground 1425, and the other second amplifier input may be coupled to the drive winding 1440 and the sense winding 1420 (e.g., such that the second amplifier inputs are coupled in parallel with the first series combination 1415 and the second series combination 1430). Moreover, a burden resistor 1450 may be coupled between the second non-inverting amplifier input and the second amplifier output.

In some aspects, primary winding 1405, core 1410, first series combination 1415, sense winding 1420, circuit ground 1425, second series combination 1430, circuit ground 1425, current source 1435, drive winding 1440, Hall-effect sensor 1445, burden resistor 1450, operational amplifier 1455, transresistance amplifier 1460, summing node 1465, sensor input 1475, sensor output 1480, and output 1470 are each examples of, or each include aspects of, the corresponding elements described with reference to FIGS. 1-13, and 15.

Figure 15:
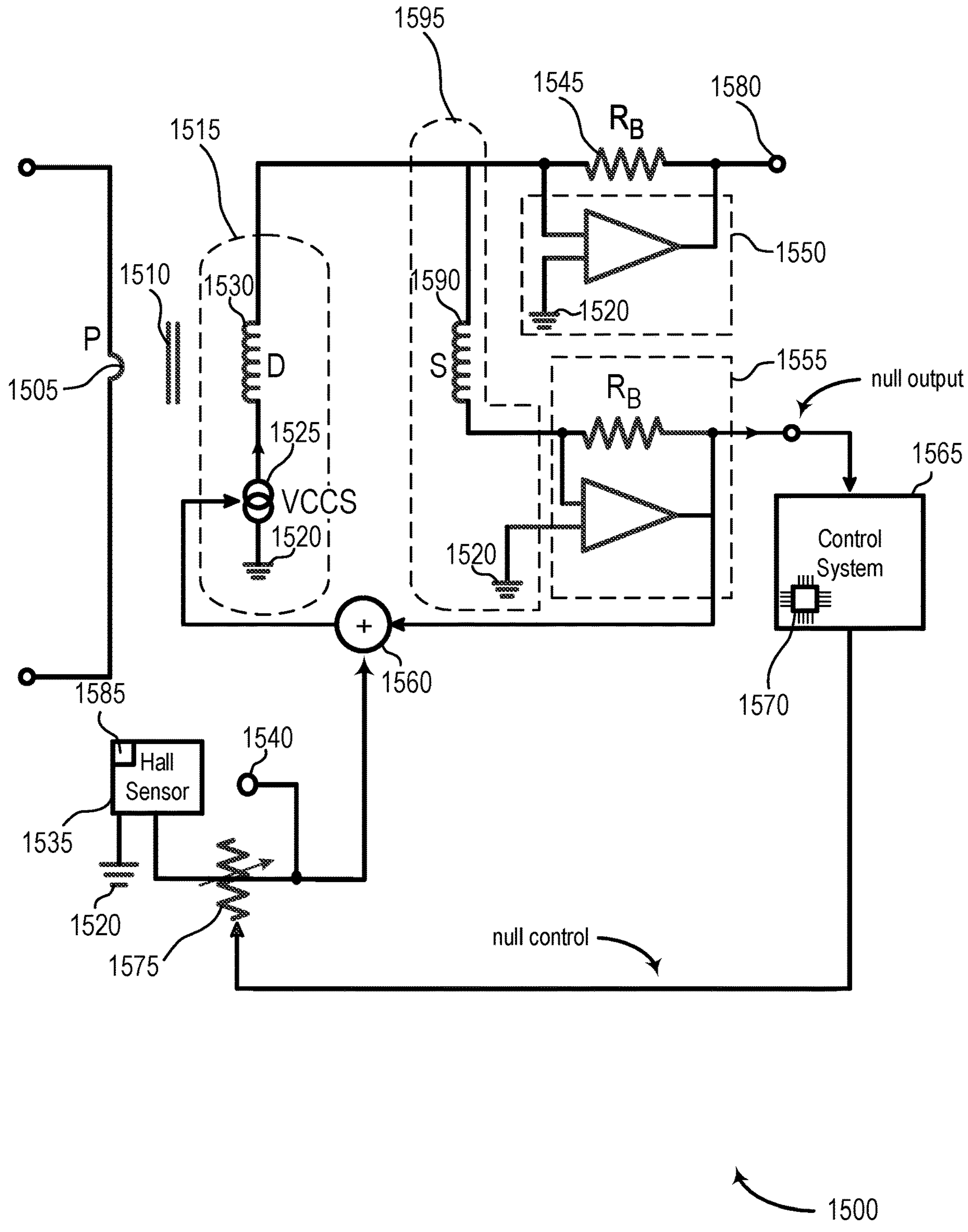

FIG. 15 shows an example of a current transformer 1500 according to aspects of the present disclosure. Current transformer 1500 is an example of, or includes aspects of, the corresponding element described with reference to FIGS. 1-14. In one aspect, current transformer 1500 includes primary winding 1505, core 1510, second series combination 1515, Hall-effect sensor 1535, burden resistor 1545, operational amplifier 1550, transresistance amplifier 1555, summing node 1560, control system 1565, programmable gain device 1575, and output 1580. In one aspect, first series combination 1595 includes sense winding 1590 and circuit ground 1520. In one aspect, second series combination 1515 includes circuit ground 1520, current source 1525, and drive winding 1530. In one aspect, Hall-effect sensor 1535 includes sensor output 1540. In one aspect, control system 1565 includes processor 1570. In one aspect, Hall-effect sensor 1535 includes sensor input 1585, sensor output 1590, and circuit ground 1520.

As described herein, in some examples, current transformer 1500 may include a second output 1580, a programmable gain device 1575, and a control system 1565. The second output stage 1580 may be coupled in parallel with the first series combination and the second series combination 1515. The programmable gain device 1575 may be coupled to, and interposed between, the Hall-effect sensor 1535 and the current source 1525. In some aspects, the programmable gain device 1575 may be configured to control an output voltage gain of the Hall-effect sensor 1535. Moreover, the control system 1565 may include a processor 1570, and the transresistance amplifier 1555 may include a voltage output. In some aspects, the control system 1565 may be configured to receive the transresistance amplifier 1555 voltage output and adjust the programmable gain device 1575 to minimize the voltage at the output of the transresistance amplifier 1555.

A processor 1570 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor 1570 is configured to operate a memory array using a memory controller. In other cases, a memory controller is integrated into the processor 1570. In some cases, the processor 1570 is configured to execute computer-readable instructions stored in a memory to perform various functions. In some embodiments, a processor 1570 includes special purpose components for modem processing, baseband processing, digital signal processing, or transmission processing.

In some embodiments, the control system 1565 is a computing device selected from a group including an analog computer, a digital signal processor, a microcontroller, and a similar computing device. In some embodiments, the control system 1565 is equipped with an analog-to-digital converter to convert the output voltage of the transresistance amplifier 1555 to a digital signal, a control output coupled to the Hall-effect sensor 1535 and the programmable gain device 1575, and a program memory.

In some embodiments, the programmable gain device 1575 is selected from a group including an electronic potentiometer, a multiplying digital-to-analog converter, an analog multiplier, and a device providing a similar function.

FIG. 15 shows another example of a current transformer 1500 according to one or more aspects of the present disclosure. In the example current transformer 1500 design of FIG. 15, a current mirror may be implemented using a transresistance amplifier 1555, where the output of the transresistance amplifier 1555 is summed with the Hall-effect sensor 1535 output and applied to a single current source 1525. In some aspects, performance of the current transformer 1500 design of FIG. 15 may be similar to the current transformer 1500 design of FIGS. 10 and 12 (e.g., but where the current transformer 1500 design of FIG. 15 has an extra output whose value is proportional to the current in the sense winding).

As the error of a current transformer is caused by the magnetizing flux required to generate the sense current, performance may be improved by reducing the sense current (e.g., according to one or more aspects of the techniques and designs described herein). In some examples, the sense-current amplifier output (e.g., the 'null output' in FIG. 15) can go to an analog or digital signal processor which can be used to trim the Hall-effect sensor 1535 gain (e.g., the 'null control' in FIG. 15), which may reduce the sense current and resulting error. For instance, the trimmed output error of the Hall-effect sensor 1535 circuit can now be less than 0.1%, making it quite useful on its own right, as well as if the Hall-effect sensor 1535 has a linear dynamic range greater than that of the main current transformer 1500 system.

The trimmed Hall-effect sensor 1535 output may be useful, for example, in a current measuring device used on a power system where occasional fault currents are experienced. These current surges can be several times the normal operating current. Making measurements of current surges during the faults may be useful for later analysis of the cause of the fault.

Furthermore, with the Hall-effect sensor 1535 path providing reduced trimmed error (e.g., trimmed error of <0.1%), and with the error reduction of the current mirror and the sense winding itself (e.g., each providing an improvement of 100:1 or so), a current transformer (e.g., a current transformer 1500) may be designed and built with an overall error well under 1 ppm, according to one or more aspects of the techniques described herein. Thus, in some aspects, overall performance may be limited only by the precision of the burden resistor 1545. Accordingly, according to one or more aspects of the techniques and designs described herein, improved accuracy, simplified manufacturing, reduced costs, etc. may be achieved by a current transformer system.

In another embodiment, the circuit of FIG. 15 does not include the burden resistor 1545 and operational amplifier 1550, such as similarly shown in FIGS. 5, 7, 9, 11, and 13.

In some aspects, primary winding 1505, core 1510, first series combination 1595, second series combination 1515, circuit ground 1520, current source 1525, drive winding 1530, Hall-effect sensor 1535, sensor output 1540, burden resistor 1545, operational amplifier 1550, transresistance amplifier 1555, summing node 1560, sensor input 1585, sense winding 1590, and output 1580 are each examples of, or each include aspects of, the corresponding elements described with reference to FIGS. 1-14.

Figure 16:
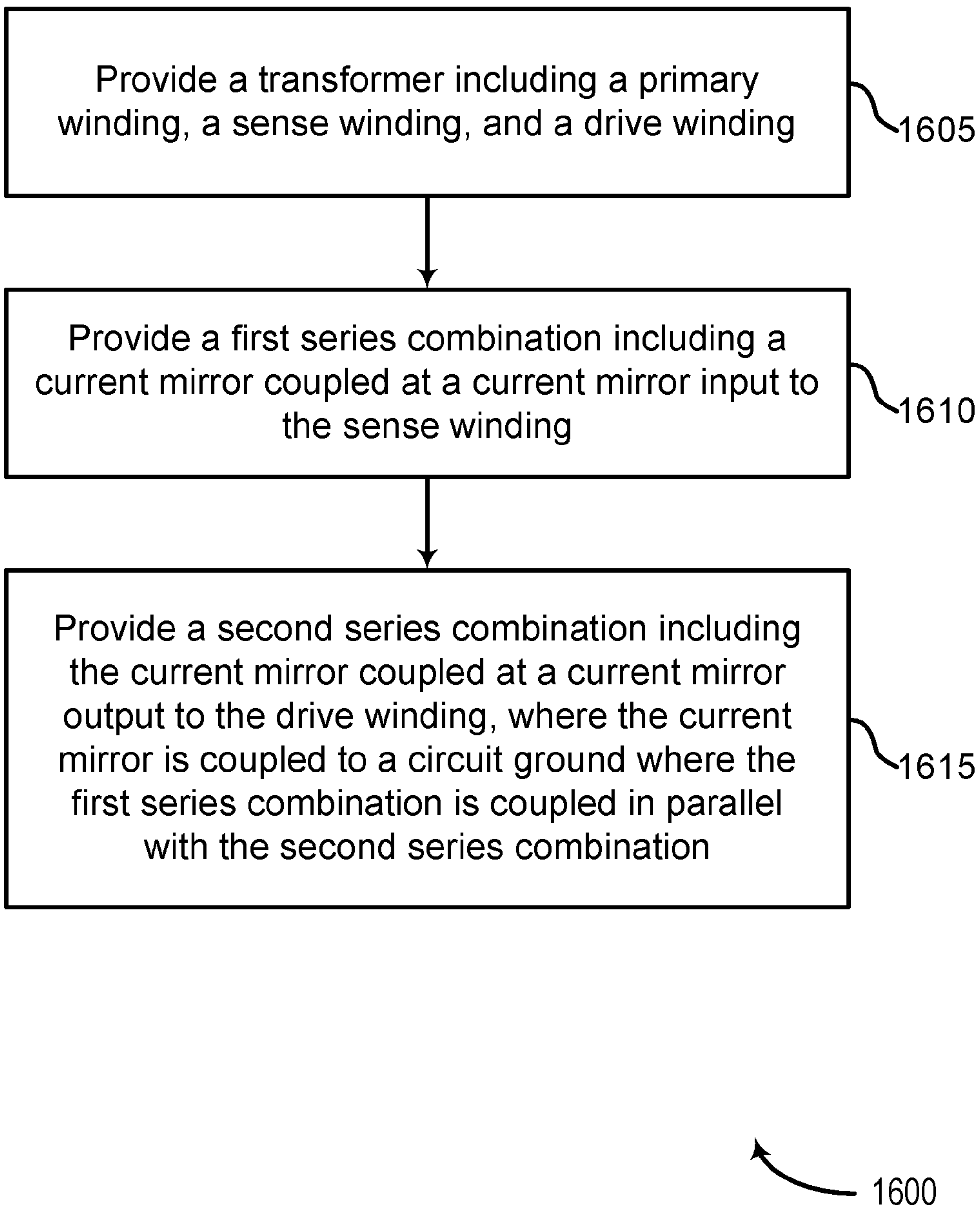
FIGS. 16 through 17 show examples of methods for electric power technologies according to one or more aspects of the present disclosure.

FIG. 16 shows an example of a method 1600 for electric power technologies according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1605, the system provides a transformer including a primary winding, a sense winding, and a drive winding. In some cases, the operations of this step refer to, or may be performed by, a current transformer as described with reference to FIGS. 1-15.

At operation 1610, the system provides a first series combination including a current mirror coupled at a current mirror input to the sense winding. In some cases, the operations of this step refer to, or may be performed by, a first series combination as described with reference to FIGS. 5-14.

At operation 1615, the system provides a second series combination including the current mirror coupled at a current mirror output to the drive winding, where the current mirror is coupled to a circuit ground where the first series combination is coupled in parallel with the second series combination. In some cases, the operations of this step refer to, or may be performed by, a second series combination as described with reference to FIGS. 5-15.

In some cases, various aspects of operations 1605-1615 may be performed by, or facilitated by, a manufacturer, a manufacturing facility, a circuit designer, an engineer, and electrician, etc. (e.g., as described in more detail herein).

Figure 17:
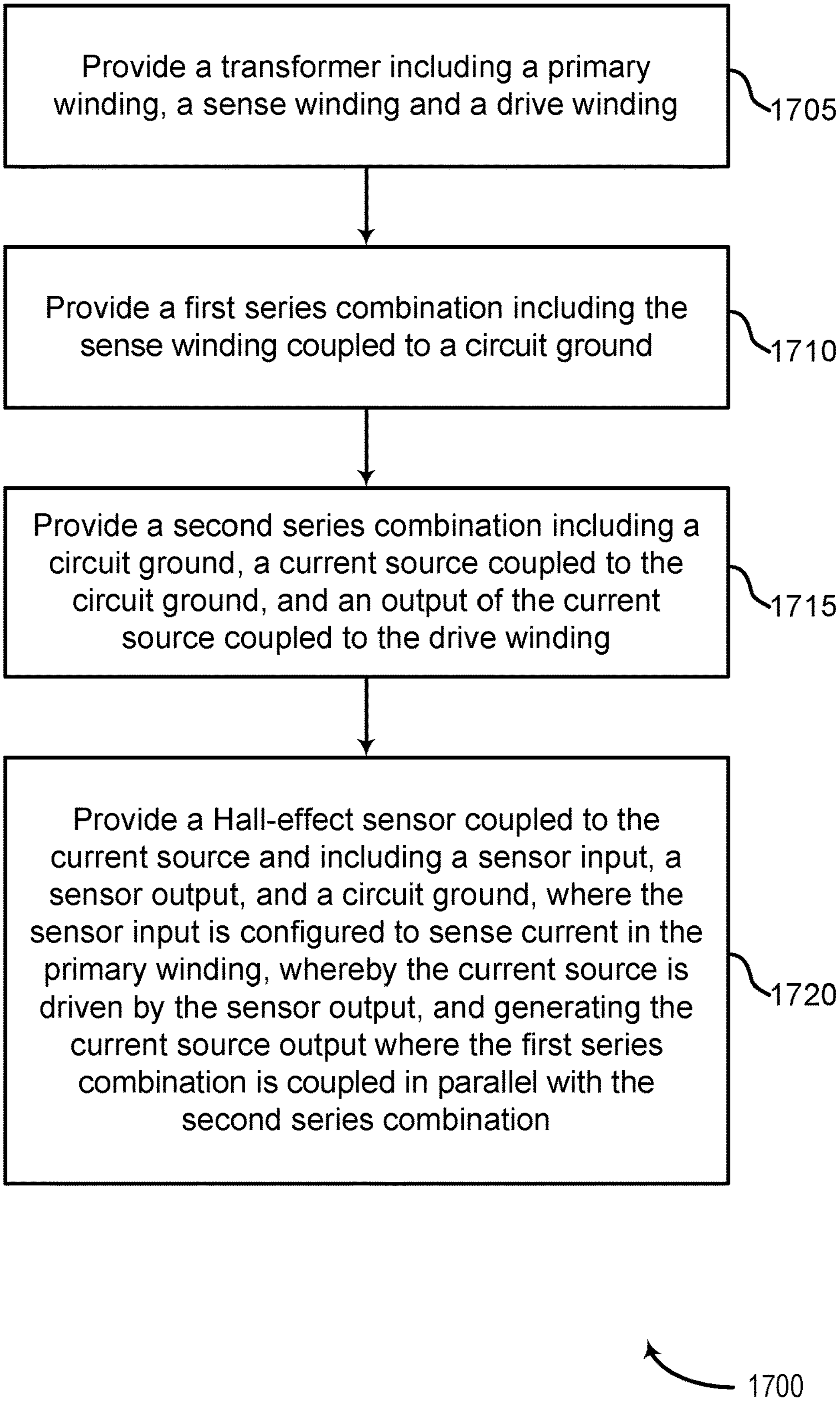

FIG. 17 shows an example of a method 1700 for electric power technologies according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1705, the system provides a transformer including a primary winding, a sense winding and a drive winding. In some cases, the operations of this step refer to, or may be performed by, a current transformer as described with reference to FIGS. 1-15.

At operation 1710, the system provides a first series combination including the sense winding coupled to a circuit ground. In some cases, the operations of this step refer to, or may be performed by, a first series combination as described with reference to FIGS. 5-14.

At operation 1715, the system provides a second series combination including a circuit ground, a current source coupled to the circuit ground, and an output of the current source coupled to the drive winding. In some cases, the operations of this step refer to, or may be performed by, a second series combination as described with reference to FIGS. 5-15.

At operation 1720, the system provides a Hall-effect sensor coupled to the current source and including a sensor input, a sensor output, and a circuit ground, where the sensor input is configured to sense current in the primary winding, whereby the current source is driven by the sensor output, and generating the current source output where the first series combination is coupled in parallel with the second series combination. In some cases, the operations of this step refer to, or may be performed by, a Hall-effect sensor as described with reference to FIGS. 7-15.

In some cases, various aspects of operations 1705-1720 may be performed by, or facilitated by, a manufacturer, a manufacturing facility, a circuit designer, an engineer, and electrician, etc. (e.g., as described in more detail herein).

Some of the functional units described in this specification have been labeled as modules, or components, to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples and applications thereof, numerous modifications and variations could be made thereto by those skilled in the art without departing from the scope of the invention set forth in the claims.

What is claimed is:

1. A current transformer comprising:

a transformer comprising a primary winding, a sense winding and a drive winding;

a first series combination comprising the sense winding coupled to a circuit ground;

a second series combination comprising the circuit ground, a current source coupled to the circuit ground, and an output of the current source coupled to said drive winding;

a Hall-effect sensor coupled to the current source and comprising a sensor input, a sensor output, and the circuit ground, wherein said sensor input is configured to sense current in said primary winding, whereby the current source is driven by the sensor output, thus generating the current source output; and wherein the first series combination is coupled in parallel with the second series combination.

2. The current transformer of claim 1 further comprising:

an operational amplifier comprising an inverting amplifier input, a non-inverting amplifier input, and an amplifier output, wherein one of the amplifier inputs is coupled to said circuit ground and the other amplifier input is coupled to the drive winding and to the sense winding such that the amplifier inputs are coupled in parallel with said first series combination and said second series combination; and a burden resistor coupled between the other amplifier input and the amplifier output.

3. The current transformer of claim 1 further comprising:

said transformer comprising another drive winding;

the first series combination further comprising a current mirror coupled at a current mirror input to the sense winding, wherein the current mirror is coupled to the circuit ground such that the current mirror input is interposed between the sense winding and the circuit ground; and a current mirror output of the current mirror coupled in to the other drive winding.

4. The current transformer of claim 3 further comprising:

an operational amplifier comprising an inverting amplifier input, a non-inverting amplifier input, and an amplifier output, wherein one of the amplifier inputs is coupled to said circuit ground and the other amplifier input is coupled to the drive winding and the sense winding such that the amplifier inputs are coupled in parallel with said first series combination, and said second series combination; and a burden resistor coupled between the other amplifier input and the amplifier output.

5. The current transformer of claim 1 further comprising:

the first series combination further comprising a current mirror coupled at a current mirror input to the sense winding wherein the current mirror is interposed between the sense winding and the circuit ground; and a current mirror output of the current mirror coupled in parallel with said current source such that an output of the current mirror flows through the drive winding.

6. The current transformer of claim 5 further comprising:
an operational amplifier comprising an inverting amplifier input, a non-inverting amplifier input, and an amplifier output, wherein one of the amplifier inputs is coupled to said circuit ground and the other amplifier input is coupled to the drive winding and the sense winding such that the amplifier inputs are coupled in parallel with said first series combination, and said second series combination; and
a burden resistor coupled between the other amplifier input and the amplifier output.

7. The current transformer of claim 1 further comprising:
a transresistance amplifier comprising an inverting amplifier input, a non-inverting amplifier input, and an amplifier output, wherein one of the amplifier inputs is coupled to the circuit ground and the other amplifier input is coupled to the sense winding at the transresistance amplifier input; and
a summing node coupled to the transresistance amplifier output and interposed between the hall sensor and the current source and configured to add an output voltage of the Hall-effect sensor and an output voltage of the transresistance amplifier, wherein the current resulting from the adding of the voltages flows through the drive winding.

8. The current transformer of claim 7 further comprising:
an operational amplifier comprising a second inverting amplifier input, a second non-inverting amplifier input, and a second amplifier output, wherein one of the second amplifier inputs is coupled to said circuit ground, and the other second amplifier input is coupled to the drive winding and the sense winding such that the second amplifier inputs are coupled in parallel with said first series combination, and said second series combination; and
a burden resistor coupled between said other second amplifier input and the second amplifier output.

9. The current transformer of claim 7 further comprising:
a programmable gain device coupled to and interposed between the Hall-effect sensor and the current source wherein the programmable gain device is configured to control an output voltage gain of the Hall-effect sensor; and
a control system including a processor, wherein the transresistance amplifier further comprises a voltage output and wherein the control system is configured to receive the transresistance amplifier voltage output and adjust the programmable gain device to minimize the voltage at the output of the transresistance amplifier.

10. The current transformer of claim 9 further, wherein said control system is a computing device selected from a group consisting of an analog computer, a digital signal processor, a microcontroller, and a similar computing device.

11. The current transformer of claim 9 wherein said control system is equipped with an analog-to-digital converter to convert the output voltage of the transresistance amplifier to a digital signal, a control output coupled to said Hall-effect sensor and said programmable gain device, and a program memory.

12. The current transformer of claim 9 wherein said programmable gain device is selected from a group consisting of an electronic potentiometer, a multiplying digital-to-analog converter, an analog multiplier, and a device providing a similar function.

13. The current transformer of claim 1, wherein the output voltage of the Hall-effect sensor is applied to the current source and the gain of the current source is adjusted to result in a current approximately equal to $I_{IN}/K$, where $I_{IN}$ is the current in the K, primary winding and $K=N_S/N_P$, where $N_S$ is a number of sense winding turns and $N_P$ is a number of primary winding turns wound on a core of the current transformer, whereby a required current in the sense winding is reduced.

14. The current transformer of claim 1, wherein the current source is voltage-controlled.

* * * * *